United States Patent
Hansen et al.

(10) Patent No.: US 6,212,752 B1
(45) Date of Patent: Apr. 10, 2001

(54) AUTOMATED FUEL TANK ASSEMBLY SYSTEM & METHOD

(75) Inventors: Richard K. Hansen, Morrison; Jeffrey M. Simonson, Conifer, both of CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/388,564

(22) Filed: Sep. 2, 1999

Related U.S. Application Data

(60) Provisional application No. 60/099,206, filed on Sep. 3, 1998.

(51) Int. Cl.$^7$ .................................................. B23Q 17/00
(52) U.S. Cl. ................................. 29/407.05; 29/407.01; 29/897.2; 33/545; 33/832; 702/155; 702/158
(58) Field of Search .............................. 29/897.2, 407.01, 29/407.05, 407.09, 407.1, 702; 33/832, 833, 549, 555, 503, 545; 702/155, 158, 159; 244/158 R, 135 R

(56) References Cited

U.S. PATENT DOCUMENTS

| | | | | |
|---|---|---|---|---|
| 2,609,609 | * | 9/1952 | Moss | 33/174 |
| 3,178,510 | * | 4/1965 | Rosin et al. | 178/6.8 |
| 3,304,724 | * | 2/1967 | Blumrich et al. | 60/257 |
| 3,776,072 | | 12/1973 | Gerber et al. | 83/34 |
| 3,811,196 | * | 5/1974 | Smith | 33/185 R |
| 4,075,916 | | 2/1978 | Fisher | 82/78 |
| 4,234,942 | * | 11/1980 | Prause et al. | 367/128 |
| 4,554,495 | | 11/1985 | Davis | 318/572 |
| 4,557,170 | * | 12/1985 | Ingham | 83/468 |
| 4,656,897 | | 4/1987 | Von Niedehausern et al. | 82/2 B |
| 4,766,674 | * | 8/1988 | Zanier et al. | 33/503 |
| 4,854,050 | * | 8/1989 | McMurty | 33/558 |
| 4,908,953 | * | 3/1990 | Wallisser | 33/701 |
| 5,063,801 | | 11/1991 | Wallis | 83/37 |
| 5,170,684 | | 12/1992 | Lofstrom | 82/70.1 |
| 5,406,870 | | 4/1995 | Suitts et al. | 83/23 |
| 5,458,031 | | 10/1995 | Wolff | 82/92 |
| 5,590,060 | * | 12/1996 | Granville et al. | 364/560 |
| 5,664,311 | | 9/1997 | Banks et al. | 29/407.04 |
| 5,937,533 | * | 8/1999 | Meyer et al. | 33/832 |
| 5,991,706 | * | 11/1999 | Tsukamoto et al. | 702/182 |

* cited by examiner

*Primary Examiner*—S. Thomas Hughes
*Assistant Examiner*—Essama Omgba
(74) *Attorney, Agent, or Firm*—Marsh, Fischmann & Breyfogle LLP

(57) ABSTRACT

A system and method for assembling a fuel tank is disclosed. A measuring device is mounted on a carriage on which at least one machine tool (e.g., saw, router) is also mounted. This carriage is operatively interconnected with a computer and may be longitudinally moved between a headstock and tailstock which are longitudinally displaced and on which various subassemblies of the fuel tank may be mounted during the assembly of a given fuel tank. Length measurements are preferably made of each fuel tank subassembly prior to any machining operation being executed thereon, as well as after each such machining operation, by monitoring/knowing the longitudinal position of the carriage via the measuring device. These length measurements may be automatically recorded on an appropriate computer-readable storage medium in relation to the subject fuel tank subassembly and the subject fuel tank. This information may be used to evaluate supplier compliance with engineering specifications and/or performance of the system in assembling fuel tanks.

21 Claims, 8 Drawing Sheets

AUTOMATED FUEL TANK ASSEMBLY SYSTEM & METHOD

CROSS-REFERENCE TO RELATED APPLICATIONS

This patent application is a utility patent application based upon U.S. Provisional Patent Application Ser. No. 60/099,206, filed Sep. 3, 1998, and entitled "AUTOMATED MEASURING AND ARCHIVING SYSTEM," the entire disclosure of which is incorporated by reference in its entirety herein.

FIELD OF THE INVENTION

Generally, the present invention is directed to a system and method for measuring, processing and archiving launch vehicle tank subassemblies, (e.g., barrels, skirts, etc.), and is particularly useful in determining supplier tolerance and repeatability capabilities, and in determining the amount of fuel to be contained within the launch vehicle fuel tanks since welds between tank subassemblies (e.g., a skirt welded to a barrel) can result in shrinkage of the overall length between subassemblies.

BACKGROUND OF THE INVENTION

Launch and other space travel vehicles often include one or more fuel tanks for the storage of an appropriate fuel therein. These fuel tanks include an enclosed structure or a "pressure vessel", as well as structure for interconnecting a given fuel tank with another fuel tank or an engine. Relatively large amounts of fuel are required, and therefore each of the fuel tanks is typically defined by a plurality of fuel tank subassemblies which are appropriately interconnected. One common configuration for fuel tanks of this type which has been employed and which is admitted to be prior art is one in which two "combos" were interconnected by a barrel. Each combo was defined by a skirt which was welded to a dome body. Both ends of the skirt were open and the skirt was of a cylindrical configuration, extending concentrically about and along a central, longitudinal axis of the fuel tank. One end of the dome body was closed and defined by a "domed" surface which was centrally disposed about the central, longitudinal axis of the fuel tank, and further which was typically disposed between the two open ends of the skirt, while its opposite end was open and extended beyond one of the open ends of the skirt for interconnecting the dome body with both the skirt and the barrel. Definition of the open end of the dome body was actually provided by a cylindrical portion which extended from the outer perimeter of the domed surface to the opposite open end concentrically about and along the central, longitudinal axis of the fuel tank. There a generally T-shaped connector of sorts extended radially outwardly relative to the central, longitudinal axis of the fuel tank (i.e., the bottom "leg" of the T-shaped connector extended at least generally outwardly and away from the cylindrical portion of the dome body). One of the two "upper legs" of the T-shaped connector butted up against one of the ends of the skirt and was welded thereto, while the other of the "upper legs" of the T-shaped connector butted up against one of the two open ends of the cylindrical barrel and was welded thereto.

One known prior art method for assembling fuel tanks from the above-noted subassemblies used a system having a headstock and a longitudinally displaced tailstock which each functioned as a chuck of sorts to retain/hold a fuel tank subassembly. A track extended longitudinally between this headstock and tailstock and along which both the headstock and tailstock could axially move. A carriage of sorts was also movably interconnected with this track and had both a saw and a router attached thereto. Movement of this carriage was controlled by an appropriate operative interconnection with a drive assembly, which in turn was manually controlled by appropriate personnel. Welds between adjoining fuel tank subassemblies were provided by a welding assembly which was associated with the system as well.

Assemblage of a fuel tank using the above-noted system and in accordance with an admitted prior art protocol first entailed attaching one of the ends of a first skirt to the headstock. Operations personnel then placed a mark or the like a predetermined distance from the end of the skirt engaged by the headstock through use of a calibrated measuring tape, stick, or other item of fixed length. This "predetermined distance" corresponded with the length of the skirt as set forth on the relevant engineering drawing. Thereafter, the carriage was moved longitudinally along the track to bring the router into contact with the free end of the skirt through manual control of the longitudinal position of the carriage (and thereby the router) by appropriate personnel, and by what is commonly referred to as a "sneaking up" operation. That is, the carriage was moved to a certain longitudinal position and the skirt was rotated to see if the router engaged any portion thereof. If there was no engagement, the operator would try to estimate how much the router had to be moved longitudinally by visual analysis, and the carriage would then be moved longitudinally this amount to again check and see if the router would engage any portion of the skirt during rotation thereof. This was repeated until engagement was established.

Routering operations were effected on the noted end of the skirt by using relative rotational motion between the skirt and the router. Typically this involved rotating the skirt via rotation of the headstock. Furthermore, the router was moved longitudinally toward the headstock by longitudinal movement of the carriage along the track toward the headstock via the carriage drive assembly until the router reached the above-noted mark and which was determined through visual inspection by appropriate personnel. Further longitudinal movements of the carriage toward the headstock were then manually terminated by the appropriate personnel. Visual inspection of the machined end of the skirt was then undertaken by appropriate personnel. If any portion of the end of the skirt was visually determined to lack router markings, it was assumed that the skirt did not meet the minimum length requirement of the skirt for the subject fuel tank. Discussions were then typically undertaken with relevant personnel to determine how to best proceed (i.e., recover). If the entire circumference of the end of the skirt was determined to have router markings thereon through the noted visual inspection by appropriate personnel, appropriate personnel manually measured the length of the skirt at one radial location and then manually recorded this information in a log book.

The free end of one dome body was attached to the tailstock either before or after prepping the end of the skirt in the above-noted manner. More specifically, the free end of that upper leg of the above-noted T-shaped connector which was to interface with the barrel was engaged by the tailstock. Advancement of the tailstock longitudinally toward the headstock was then undertaken to position the free end of the other upper leg of the T-shaped connector in abutting engagement with the end of the skirt which was prepped in the above-noted manner. A circumferential weld was then made between the skirt and the dome at this butt joint. The resulting structure was again commonly referred to as a combo. The tailstock then released the dome body and proceeded longitudinally away from the headstock for preparation of a barrel for attachment to the combos.

Only one of the upper legs of the T-shaped connector on the free end of the dome body thereby remained after pursuing the protocol thus far described. Actions were then undertaken to prepare the free end of this remaining leg of the T-shaped connector of the dome body for attachment to one of the ends of the open-ended, cylindrical barrel. The carriage would be moved to a certain longitudinal position for sawing a section off of the subject leg of the T-shaped connector through manual operator control of the longitudinal position of the carriage relative to the dome body. The specified length of the combo would be known from the corresponding engineering drawing(s) and was measured from the end of the skirt engaged by the headstock. A mark was placed at this longitudinal position on the dome body in generally the same manner set forth above in relation to the skirt. Operations personnel would manually control longitudinal movement of the carriage (and thereby the saw) to place the saw in the desired longitudinal position for producing a circumferential cut about the entire perimeter of the remaining free leg of the T-shaped connector on the free end of the dome body (using relative rotational movement between the saw and dome body). This "desired longitudinal position" was one which was slightly beyond the location of the noted mark (i.e., further from the headstock) since routering operations were done after these sawing operations. Routering operations were conducted on the subject end of the dome body generally in the manner discussed above in relation to the skirt. Measurement of the length of the combo was manually made by operations personnel (the distance between the end of the skirt mounted on the headstock and the free end of the remaining free leg of the T-shaped connector defining the free end of the dome body) upon completion of this routering, and this value was manually recorded in a log book by appropriate personnel. This combo was then removed from the headstock, and another combo was built in the same manner as the foregoing.

The barrel commonly used in prior art fuel tank designs, like the skirt, was an open-ended cylinder having a pair of longitudinally spaced free and open ends as noted. One of these ends was attached to the tailstock, and the carriage was then longitudinally moved to position the saw thereon at a certain longitudinal location proximate the opposite end through manual control of the drive assembly by appropriate personnel. Typically operations personnel would manually measure in a certain distance from this end of the barrel (e.g., 2 or 3 inches) and place a mark thereat. Operations personnel would then manually control the longitudinal position of the carriage to dispose the saw just beyond this location (i.e., closer to the free open end opposite that engaged by the tailstock). Relative rotational movement between the barrel and the saw was then undertaken to produce a circumferential cut on the barrel, typically by rotating the barrel through rotation of the tailstock. Thereafter, this end of the barrel was also routered through operations personnel manually controlling the longitudinal position of the carriage relative to the tailstock and through relative rotational motion between the barrel and the router (typically via rotation of the tailstock), and further generally in the manner discussed above in relation to the skirt, to obtain the desired length.

Advancement of the tailstock with the barrel attached thereto longitudinally toward the headstock with one of the combos attached thereto was then made to dispose the "prepped" end of the barrel in abutting engagement with the "prepped" end of the remaining free upper leg of the T-shaped connector on the end of the dome body of the combo currently attached to the headstock. Welding operations were then initiated to create a circumferential weld between this combo and the barrel. Thereafter, the barrel was released by the tailstock and its remaining free end was prepared for attachment to the other combo which was previously assembled and which could now be attached to the tailstock. In this regard, a mark was placed on the barrel a predetermined length from the end of the skirt engaged by the headstock, and thereafter sawing and routering operations were undertaken generally in the manner discussed above to obtain the desired length for the combo and barrel interconnected therewith. Appropriate personnel would then manually measure the end length of the combo with the barrel attached thereto and manually record the same in a log book. After having mounted the previously formed combo in the tailstock and longitudinally advancing the same toward the barrel to position the remaining free end of the barrel in abutting engagement with the prepped end of the remaining free upper leg of the T-shaped connector on the free end of the dome body of the second combo, welding operations were initiated to complete the definition of the fuel tank.

BRIEF SUMMARY OF THE INVENTION

The present invention is particularly suited to the assembly of a fuel tank for a launch or other space travel vehicle from multiple fuel tank subassemblies. Although the present invention will be discussed with regard to this particular application, the principles presented herein are applicable to the assembly of any type of pressure vessel from multiple subassemblies.

A first aspect of the present invention is generally directed to the assembly of an enclosed fuel tank for a space travel vessel from at least first and second fuel tank subassemblies. Each of these first and second fuel tank subassemblies have first and second longitudinally spaced ends. Preparation of the first fuel tank subassembly for attachment to the second fuel tank subassembly includes measuring the length of the first fuel tank subassembly between its two ends and then recording the same in a first instance. As such, this will be referred to as a "first length measurement." Measuring the first fuel tank subassembly at this time may be used to evaluate a supplier's compliance with engineering specifications provided in relation to the first fuel tank subassembly, and which maybe augmented by having these measurements from a common supplier of a plurality of these same first fuel tank subassemblies. After this first length measurement is obtained, at least some type of machining operation is executed on the first fuel tank subassembly at a location which may be characterized as being longitudinally spaced from its first end. Representative machining operations include sawing and routering operations which would be executed on the first fuel tank subassembly at a location spaced from the first end, commonly at least generally proximate the second end (e.g., sawing operations typically being done at a location which is longitudinally spaced from the second end a relatively small distance, and routering operations being done on the second end itself). In any case, the subject machining of the first fuel tank subassembly defines a new second end therefore since the length of the first fuel tank subassembly is modified from its original state (e.g., as received from the supplier). In this regard, after the machining operation, the length of the first fuel tank subassembly between its longitudinally spaced ends is once again measured. Since this is the second instance of the measurement of the length of the first fuel tank subassembly, such will be referred to as a "second length measurement." This second length measurement is also recorded. Measuring the first fuel tank subassembly at this time may be used to evaluate the accuracy of the machining operation which was just done in relation to the first fuel tank subassembly, and which may be augmented by having these measurements from a plurality of similar machining operations conducted on a plurality of the same first fuel tank subassemblies. At least sometime after obtaining the second length measurement of the first fuel tank subassembly, the newly defined second end of the first fuel tank subassembly is attached (e.g., welded) to one of the ends of the second fuel tank subassembly. Preferably this second fuel tank subassembly has been "prepared" for attachment to the first fuel tank subassembly in the same general manner noted above in relation to the first fuel tank subassembly (e.g., measuring length before and after each machining operation).

Various refinements exist of the features noted in relation to the subject first aspect of the present invention. Further features may also be incorporated in the subject first aspect of the present invention as well. These refinements and additional features may exist individually or in any combination. Measurement of the length of a particular fuel tank subassembly may entail longitudinally advancing a measuring device along the subject fuel tank subassembly. First the measuring device may be longitudinally advanced to dispose the measuring device past the second end of the same such that the second end is actually then longitudinally disposed between the measuring device and its corresponding first end of the subject fuel tank subassembly. The measuring device may then be longitudinally advanced back toward the second end of the subject fuel tank subassembly (in the opposite direction to that referred to above) until the measuring device engages the second end of the subject fuel tank subassembly. Positioning the measuring device at a longitudinal location corresponding with the longitudinal position of the first end of the subject fuel tank subassembly before initiating the above-described movements of the measuring device may define a first position (which may entail a longitudinal advancement of the measuring device to this location as well), and the position of the measuring device upon termination of its motion by its engagement with the second end of the subject fuel tank subassembly may define a second position. The length of the subject fuel tank subassembly may be derived from these two positions.

Actions may be undertaken to increase the likelihood that the measuring device will actually contact the second end of the subject fuel tank subassembly when moved longitudinally back towards the same in the longitudinal direction. Longitudinal movement of the measuring device toward the second end of the subject fuel tank subassembly, when coming from the direction of the first end of the subject fuel tank subassembly, may be terminated before actually disposing the measuring device at a longitudinal location which is beyond the longitudinal position of the second end of the subject fuel tank subassembly. The measuring device then may be directed at least generally laterally or toward the subject fuel tank subassembly until contacting the same (e.g., to "hit" the body of the subject fuel tank subassembly or its outer diameter), at which time further lateral movement of the measuring device in this direction may be terminated. This serves to determine the position in space of the outer wall of the subject fuel tank subassembly at its current radial position, which may be defined relative to a reference axis about which the subject fuel tank subassembly assembly is disposed and extends longitudinally along. This lateral position of the measuring device is noted, the measuring device is laterally retracted away from the body of the subject fuel tank subassembly a certain amount, and the measuring device is then longitudinal advanced so as to be disposed longitudinally beyond the second end of the subject fuel tank subassembly. Then the measuring device is laterally advanced at least generally toward the reference axis to a position such that when it is longitudinally advanced back toward the second end of the subject fuel tank subassembly, it will contact the same so that the length measurement may be obtained (e.g., the amount that the measuring device was retracted away from the outer diameter of the subject fuel tank subassembly, plus possibly an amount relating to the configuration/dimension of a sensing surface of the measuring device).

The length of a particular fuel tank subassembly before any machining thereof in accordance with the above may be measured at each of plurality of radially spaced locations (i.e., to check for length variations at different locations between the first and second ends). One way to affect these measurements would be to rotate the subject fuel tank subassembly relative to a measuring device, to stop this relative rotational movement at each of a plurality of radially spaced locations, and then obtain the length measurement in accordance with the foregoing. What is considered as "radially spaced" may be illustrated by the case of a fuel tank subassembly which includes at least a cylindrical portion. Assume that the measuring device is disposed at the 0 degree location of the cylindrical portion and relative to an axis about which the cylindrical portion is disposed. The length may be measured at this 0 degree location. Thereafter relative rotational motion may be employed to rotate the cylindrical portion 15 degrees about the noted axis, and another length measurement may again proceed in accordance with the foregoing. Any desired radial spacing may of course be employed.

Obtaining a plurality of first length measurements through these plurality of radially spaced locations may be used to identify a minimum length and a maximum length of the subject fuel tank subassembly. This in turn may be used to evaluate whether the subject fuel tank subassembly meets engineering specifications before being attached to the second fuel tank subassembly. That is, a certain length (including those within a certain tolerance) may be required for a first fuel tank subassembly prior to attaching the same to a second fuel tank subassembly. If the minimum length of the first fuel tank subassembly is less than the length set out in the engineering specifications, the assembly process of the fuel tank may be terminated to address how the assembly thereof should then proceed.

The subject machining operations may be affected by longitudinally advancing the required machining tool to a predetermined longitudinal location. For instance, this predetermined longitudinal location may be a fixed distance from the first end of the first fuel tank subassembly. Obtaining the second length measurement may then be used to evaluate the accuracy with which the machine tool was placed relative to the longitudinal extent of the first fuel tank subassembly. One particularly desirable implementation is to include the device which is used in the measurement of the length of the first fuel tank subassembly on a common carriage with a machine tool that does the noted machining operation.

A second aspect of the present invention is embodied in a system for assembling an enclosed fuel tank for a launch or other space travel vehicle from at least first and second fuel tank subassemblies. Each of these first and second fuel tank subassemblies have first and second longitudinally spaced ends. A pair of longitudinally spaced first and second chucks or the like are provided which function to engage/hold certain subassemblies of the fuel tank during the assembly thereof. For instance during the assembly of a given fuel tank, the first end of the first fuel tank subassembly may be engaged by the first chuck in a manner such that the first fuel tank subassembly extends away therefrom toward the second chuck, and the first end of the second fuel tank subassembly may be engaged by the second chuck in a manner such that the second fuel tank subassembly extends way therefrom toward the first chuck. Appropriate supports may be provided between the noted pair of longitudinally spaced first and second chucks to bear at least part of a load of the overlying subassembly engaged thereby.

The system of the second aspect of the present invention further includes a longitudinally extending guide assembly (e.g., a track) which is disposed at least substantially parallel with the longitudinal extent of the subassemblies when mounted on the noted chucks. Typically this track will be laterally offset from the central, longitudinal axis of the fuel tank subassemblies when mounted on or interconnected with a given chuck, but such need not be the case. A first carriage is movably interconnected with this guide assembly. Interconnected with this first carriage is a drive assembly for longitudinally moving the first carriage along the guide assembly to dispose the first carriage at different longitudinal locations relative to a fuel tank subassembly mounted on the noted chuck(s). Other motions may be affected by the drive assembly as well, and such may be defined by one or more separate drives or motors which would then collectively define a drive assembly.

Certain devices are attached to the first carriage in relation to the assembly of the fuel tank in accordance with the subject second aspect. Both a first machine tool (e.g., saw, router) and a fuel tank/fuel tank subassembly measuring device are both attached to the first carriage. Other devices may be attached to the first carriage as well, such as other machine tools used in the assembly of the fuel tank. These machine tools which are attached to the first carriage are used to prepare the ends of the various fuel tank subassemblies for interconnection with another fuel tank subassembly. In this regard, the system of the second aspect of the present invention further includes a first welding assembly for joining the various fuel tank subassemblies together.

Various refinements exist of the features noted in relation to the subject second aspect of the present invention. Further features may also be incorporated in the subject second aspect of the present invention as well. These refinements and additional features may exist individually or in any combination. Information on the length of the various fuel tank subassemblies used to define the fuel tank for the space travel vessel are preferably automatically recorded from signals sent from the measuring device. For instance, a computer-readable storage medium may be operatively interconnected with the measuring device. One desirable implementation is too operatively interconnect an appropriate computer with both the drive assembly and the measuring device to control the longitudinal movement of the first carriage along the guide assembly and to monitor the longitudinal location of the first carriage via the measuring device. Therefore, the drive assembly and the measuring device are effectively operatively interconnected as well.

Automatic recordation of information to the computer-readable storage medium from the measuring device provides various advantages. Further advantages may be realized by including a certain structure for the storage of information thereon. Preferably all information recorded on the computer-readable storage medium is associated on a fuel tank-by-fuel tank basis, and further on a fuel tank subassembly-by-fuel tank subassembly basis as well. This provides the history of each fuel tank assembled by the system of the second aspect of the present invention. Certain information is also preferably recorded on the computer-readable storage medium for each fuel tank subassembly of a given fuel tank assembled through the second aspect. Preferably the measuring device is used to measure the length of each fuel tank subassembly before having any of its ends prepared for attachment to another fuel tank subassembly (e.g., the length of the fuel tank subassembly as received from the supplier). Furthermore, preferably the measuring device is used to measure the length of each fuel tank subassembly after each machining operation executed thereon by the system of the second aspect. This would include, but is not limited to, after any sawing operation which removes an end section from a given fuel tank subassembly, as well as a routering operation which trims at least a portion of an end of a fuel tank subassembly. Such may be used to monitor the control of the machining operations being provided by the computer (e.g., the control of the longitudinal position of the same). The measuring device also may be used to measure the length of any intermediate structure in the assembly of the fuel tank, such as the interconnection of two or more fuel tank subassemblies.

A third aspect of the present invention is directed to the assembly of an enclosed fuel tank for a launch or other space travel vehicle from at least first and second fuel tank subassemblies. Each of these first and second fuel tank subassemblies have first and second longitudinally spaced ends. The length of the first fuel tank subassembly between such ends is measured at a plurality of radially spaced locations thereon. Consider the case where the first fuel tank subassembly is cylindrical or at least has a cylindrical end. "Radially spaced" in this context means a location on a perimeter of the fuel tank subassembly relative to an axis about which this cylinder or cylindrical portion is disposed. After these measurements are taken, a first machining operation is executed on the first fuel tank subassembly, such as a routering of one of the ends of the first fuel tank subassembly. Thereafter, the first fuel tank subassembly may be attached to the second fuel tank subassembly, such as by welding.

Various refinements exist of the features noted in relation to the subject third aspect of the present invention. Further features may also be incorporated in the subject third aspect of the present invention as well. These refinements and additional features may exist individually or in any combination. Length measurements may be made in accordance with that noted above in relation to the first aspect of the present invention. One way to affect the above-noted measurements would be to rotate the subject fuel tank subassembly relative to a measuring device, to stop the relative rotational movement at each of a plurality of radially spaced locations, and then obtain the length measurement in accordance with the foregoing. Obtaining a plurality of first length measurements through these plurality of radially spaced locations may be used to identify a minimum length and a maximum length of the subject fuel tank subassembly. This in turn may be used to evaluate whether the subject fuel tank subassembly meets engineering specifications before being attached to the second fuel tank subassembly. That is, a certain length (including those within a certain tolerance)

may be required for a first fuel tank subassembly prior to attaching the same to a second fuel tank subassembly. If the minimum length of the first fuel tank subassembly is less than the length set out in the engineering specifications, the assembly process of the fuel tank may be terminated to address how the assembly should then proceed. These measurements may also be used to monitor the quality of first fuel tank subassemblies being provided by a particular supplier.

DETAILED DESCRIPTION OF THE INVENTION

The present invention will now be described in relation to the accompanying drawings which at least assist in illustrating its various pertinent features.

Accordingly, the system of the present invention includes a device for measuring the length of each subassembly in various conditions (e.g., stock condition, sawed condition, and final trimmed condition), a saw for rough cutting a predetermined length from the overall length of the subassembly, if required, and a router for trimming or fine cutting of the subassembly. Of importance, the measuring device, saw and router are positionable on a turntable which is translatable along the length of the subassembly, the translational position of the measuring device, saw and router on the turntable relative to an end of the subassembly being known with precision, measurable and archivable. Furthermore, the measuring device, saw and router are in communication with a computer/processor which automates the measuring, cutting and routing/routering operations, while recording all length information.

Figure 7B:
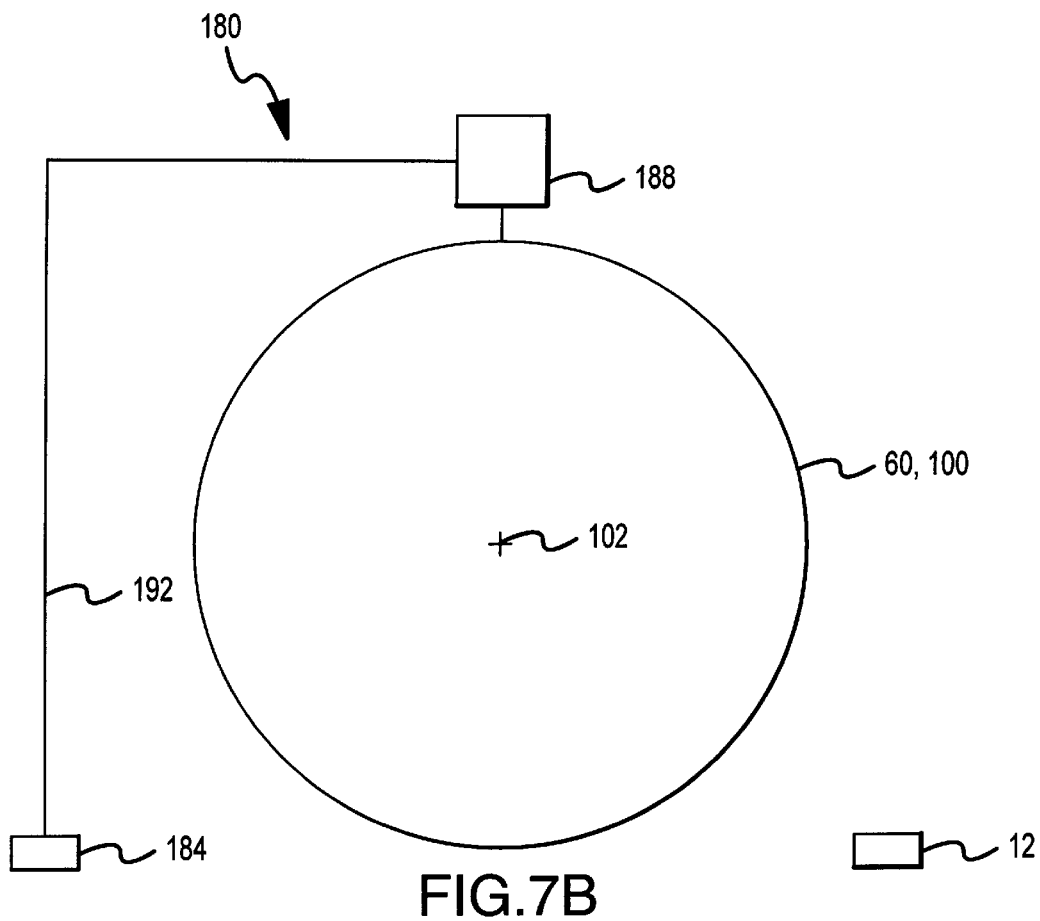
FIG. 7B is a schematic of a welding assembly which may be used by the system of FIG. 1.
Figure 7A:
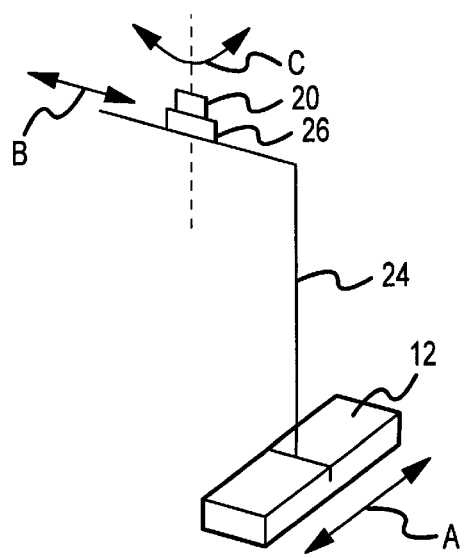
FIG. 7A is a schematic of the 3 general directions of motion available for the turntable used by the system of FIG. 1.

More specifically, and referring to FIGS. 1–6, the system 10 generally includes a turntable 20 upon which is mounted a measuring probe 30, a circular saw 40 and a router 50. The turntable 20 is interconnectable to a track 12 (e.g., by a main carriage 24 and turntable carriage 26 as illustrated in FIG. 7A) which allows the turntable 20 and equipment mounted thereon to be translated along the length of a subassembly 60 or tank as subassemblies are welded together, the position of the probe 30, circular saw 40 and router 50 relative to the subassembly or tank being precisely known (e.g., within ±0.02 inch). Each subassembly is mountable upon a tailstock 14 and a headstock 16 which is capable of rotating the subassembly relative to the turntable 20 and equipment thereon. One or more supports 98 may be disposed between the headstock 16 and tailstock 14 to bear at least part of the load of any overlying tank subassembly.

Figure 1:
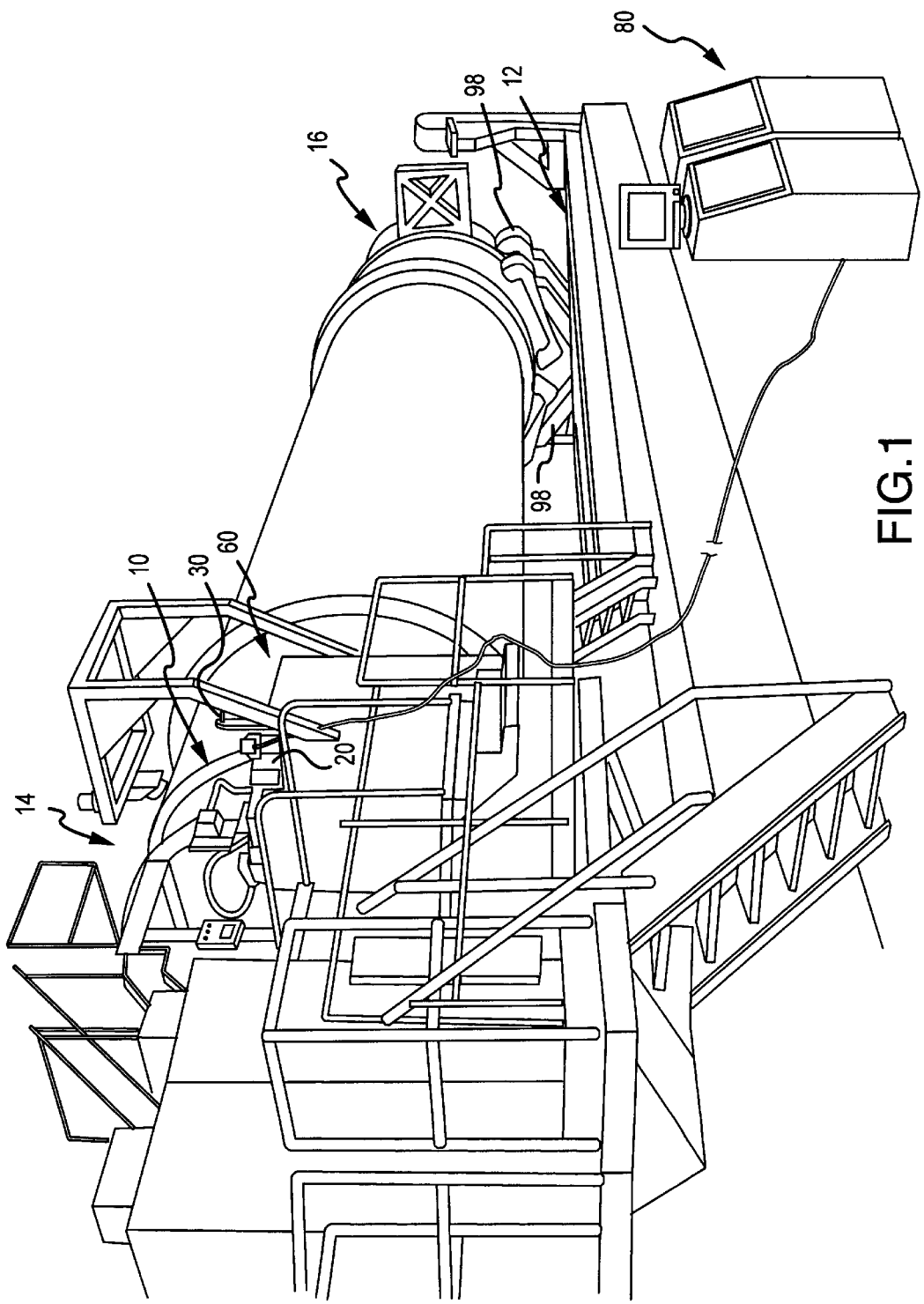
FIG. 1 is a perspective view of one embodiment of a system for assembling a fuel tank in accordance with principles of the present invention.
Figure 2:
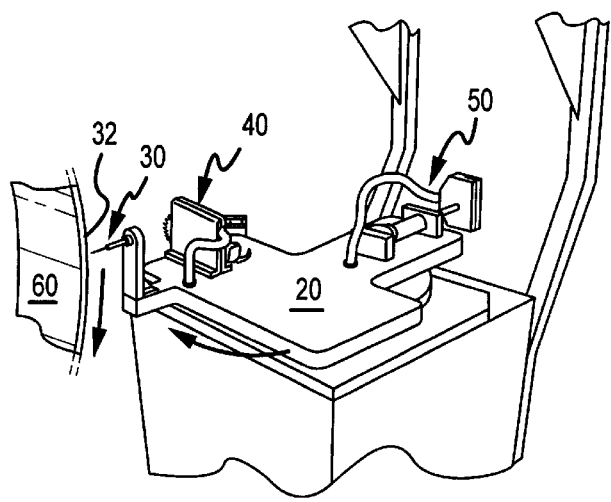
FIG. 2 is a perspective view of a turntable used by the system of FIG. 1, which has a measuring probe mounted thereon, and which has been positioned to undertake a length measurement.
Figure 3:
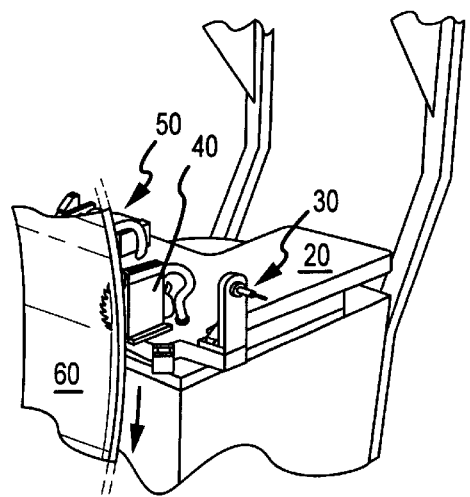
FIG. 3 is a perspective view of the turntable used by the system of FIG. 1, which further has a saw mounted thereon, and which has been positioned to undertake a sawing operation.
Figure 4:
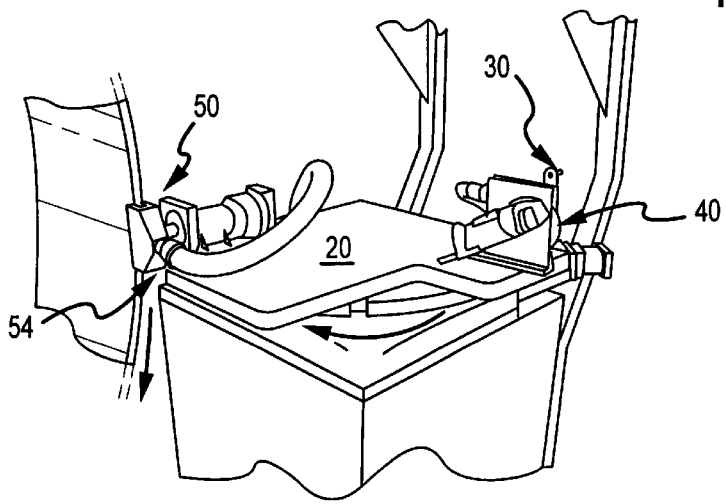
FIG. 4 is a perspective view of the turntable used by the system of FIG. 1, which further has a router mounted thereon, and which has been positioned to undertake a routering operation.
Figure 5:
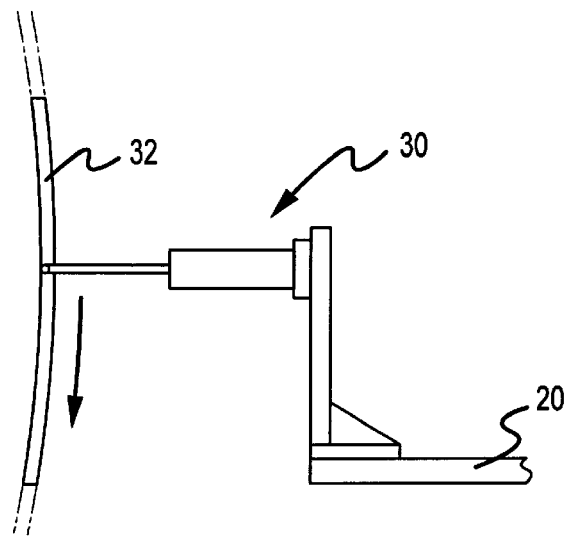
FIG. 5 is an view showing the measuring probe in position for engagement with an end of a fuel tank subassembly for measuring the length thereof.
Figure 6:
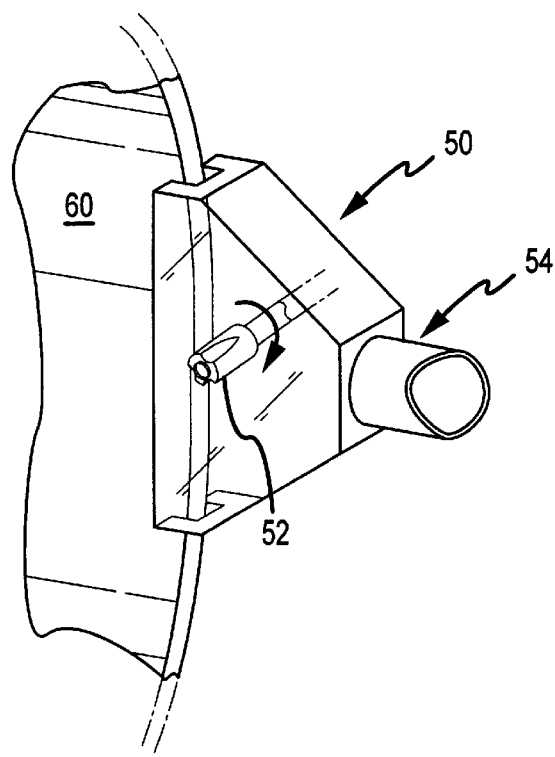
FIG. 6 is a perspective view of a vacuum system which may be used by the system of FIG. 1 to collect debris at least during routering operations.

The primary use of the probe 30 is to obtain length data from each subassembly 60 in the stock condition (e.g., before cutting operations), the sawed condition (if applicable), and the final trimmed condition (e.g., after routing). The same motion control logic that is used to position the saw 40 and the router 50 for saw and trim operations is used to send the probe 30 in search of the desired surface (e.g., end surface 32 of subassembly 60). More specifically, once the probe 30 touches an end surface 32 of the subassembly 60, an electronic switch is tripped and a "Stop Moving" command is sent to the servo controlling the search motion of the probe 30. This command is carried out substantially instantaneously. The motion control logic now prompts the just-stopped servo for its discrete location. A pre-assigned look-up table register is used to capture the reply. For example, a register (e.g., WTX[33]) may be used to obtain the fuel barrel's forward end finish length. Individual look-up tables may be automatically generated for each tank sub-assembly 60, named accordingly and transferred to an archiving area elsewhere (e.g., on a network). The registers may be assigned in such a way that all in-process length data can be electronically merged into a master tank or other sub-assembly file. This data may be used to assist in determining supplier tolerance and repeatability capabilities. The data may also identify areas where components may be delivered and processed in a near-net condition yielding reduced cycle time for final trim operations. As illustrated in FIG. 1, a computer processor 80 is utilized to control measurement/cutting/routing operations, as well as to record and archive data relating to such operations. For purposes of enhancing measurement accuracy, a Renishaw probe (e.g., Model No. LP2H) may be utilized.

In addition to automatically capturing the various in-process lengths during tank or other sub-assembly fabrication, the probe 30 may also be used to touch and reset the "Zero Datum" for the measuring axis. This is necessary since subassemblies are held in both the headstock 16 and in the tailstock 14 of the fixture illustrated in FIG. 1, which is used to rotate the sub-assemblies interconnected thereto. The headstock 16 is at a fixed location with components mounted to the left. As illustrated in FIG. 1, the tailstock 14 holds components to the right and is repositioned farther from the headstock 16 with each successive tank component 60 that is mounted and welded, as illustrated in FIG. 1.

In instances where excess stock is insufficient to perform a sawing rough cut, the probe 30 is used primarily to find the minimum and maximum length of a surface to be trimmed. Since routing typically removes only about 0.05 inch/pass, it is necessary to know the dimension of the high point of the stock. This allows the router 50 to be positioned realistically for at least partial material removal, while guarding against the possibility of tool breakage caused by too much engagement. The motion control logic can be set up to continue cutting 0.05 inch/pass until the remaining stock is removed or to trim down to the minimum stock condition. Both scenarios are used at various phases of the tank fabrication process. As with the cutting saw 40 on the turntable 20, the router 50 is also mounted parallel to and perpendicular to the headstock 16 to alleviate binding of the tool during routing operations, the headstock 16 being capable of rotating at least the subassembly relative to the probe 30, saw 40 and router 50. Further, the probe 30 is offset to the right side of the turntable 20 while the saw 40 and the router 50 are on center. The probe 30 is used to zero on a mounting datum and to obtain cut component lengths. All have different touch widths. These delta values are required to compensate for these probe-to-tool positional shifts.

In instances where cutting of the subassembly is required, the turntable 20 may be initially rotated to position the saw 40 approximately 1 inch away from the surface of the component 60 to be cut. Thereafter, the saw 40 may be rotated for cutting action and then manually jogged into or through the wall of the component 60 to be sawed. Thereafter, the component 60 may be rotated relative to the saw 40. In one embodiment, the subassembly 60 is rotated within the fixture illustrated in FIG. 1. For larger components, such as barrels for launch vehicles, break away retention tabs may be left in order to keep the portion of the component being cut from adversely separating from the remaining portion of the component.

FIG. 7A illustrates the types of movements of the turntable 20 noted above. Generally, the turntable 20 may be mounted on and movably interconnected with a turntable carriage 26 for rotation about an at least generally vertically extending reference axis in the direction of the arrow "C." The turntable carriage 26 in turn may be movably interconnected with an upper portion of main carriage 24, which at least generally extends toward the subject fuel tank subassembly, for movement in the direction of the arrow "B" (e.g., within a plane which is perpendicular to the longitudinal extent of the subject fuel tank subassembly) The main carriage 24 in turn is movably interconnected with the track 12 as noted for movement in the direction of the arrow "A." Hereafter movement in the direction of the arrow "A" will be referred to as the longitudinal direction or "longitudinally", and movement in the direction of the arrow "B" will be referred to as the lateral direction or "laterally."

In order to enhance weldability of the component to another component, the walls proximate the cut edge of the component may be cleaned and sanded prior to trimming or routing operations. The rotational tank assembly fixture may be used to rotate the component to enhance the efficiency of such cleaning and sanding operations.

Trimming operations may be conducted by first positioning the router assembly 50 by rotating the turntable 20 relative to the component to be routed and by positioning the router bit head 52 against the edge of the component (e.g., sawed edge where sawing operations were conducted). Generally, routing operations remove at least 0.05 inch as the component is rotated relative to the router 50. In any event, the component is trimmed such that the component is 0.05 inch longer than needed since welding of the component to another component results in shrinkage of the overall length of the welded components. In addition to the routing bit 52, the routing device includes a vacuum system 54 for removing particles and dust at least during routing operations.

For purposes of monitoring measurement, sawing and/or routing operations, the system may further include a camera 70 positioned proximate the turntable 20 (e.g., proximate the edge of the component to be measured/cut/routed, above the probe, router and saw on the turntable 20). Further, in another embodiment (not shown), a welding device capable of welding subassemblies together may be positioned on the turntable, the subassemblies being rotatable relative to the welding device. Alternatively, such a welding device for the system 10 may be separately mounted from the turntable 20 as in the case of the welding assembly 180 presented in FIG. 7B. The welding assembly 180 is operatively interconnected with the computer processor 80 by an appropriate communications cable or the like (not shown), and includes a weld head 188 which is mounted on a weld assembly 20 carriage 192, which is in turn movably interconnected with a track 184 similar to the track 12 noted above. The welding assembly 180 is longitudinally movable along the track 184 by an appropriate drive assembly (not shown) which may be operatively interconnected with the computer processor 80 by a communications cable or the like (not shown). Moreover, the weld head 188 may be moved toward and away from the subject fuel tank subassembly as required for welding operations.

Figure 8A:
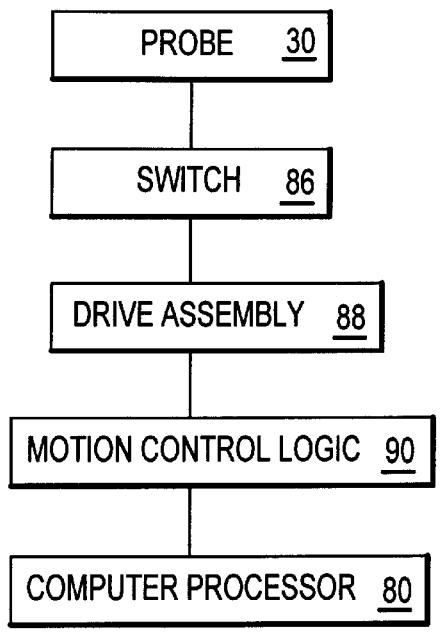
FIG. 8A is a schematic of various operative interconnections used by the system of FIG. 1.

FIG. 8A summarizes the above-noted operative interconnections of the system 10 in relation to making the above-noted types of length measurements for the various fuel tank subassemblies. The probe 30 is operatively interconnected with a switch 86, and is thereby able to send a signal (e.g., electronic) thereto. Receipt of a signal from the switch 86 terminates longitudinal movement of the turntable 20 along the track 12 by the switch 86 "signaling" a drive assembly 88 (e.g., servo motor) for the system 10. This drive assembly 88 may include one or more motors or the like, and may provide for the types of movements reflected by the arrows A, B, and C in FIG. 7A, as well as the rotation of the headstock 16 and/or tailstock 14 in a manner discussed in more detail below. This same "signaling" may be relayed to a motion control logic 90 which prompts the drive assembly 88 for its then current longitudinal position. Notation of this longitudinal position is made for purposes of determining the length of the subject fuel tank subassembly. It may be desirable to record this longitudinal position in the computer-readable storage medium system associated with the computer processor 80 in relation to the subject length measurement as well.

Figure 8B:
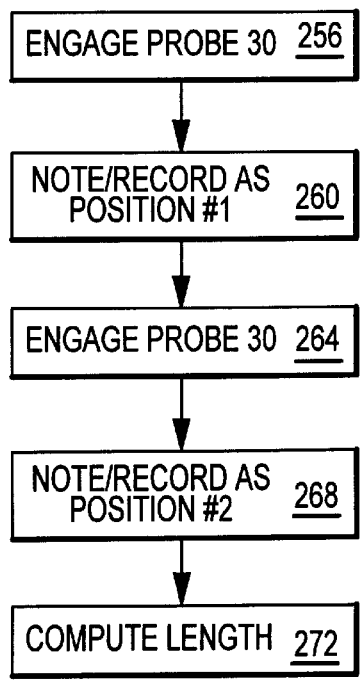
FIG. 8B is a flowchart of one protocol for making a length measurement with the system of FIG. 1.

FIG. 8B further summarizes how the above-noted length measurements maybe made using the operative interconnections noted in FIG. 8A. Length measurements may be initiated by an engagement of the probe 30 on relevant structure as indicated by step 256. Again, the probe 30 is longitudinally advanced with the turntable 20 along the track 12 until the probe 30 engages relevant structure which terminates further longitudinal movement of the turntable 20. The longitudinal position of the probe 30 at this time is noted/recorded as a position #1 and as reflected by step 260. Another engagement of the probe 30 at a longitudinally spaced location from that associated with step 256 is made and as indicated by step 264 through subsequent longitudinal advancement of the turntable 20 along the track 12. The longitudinal position of the probe 30 at this time is noted/recorded as a position #2 and as reflected by step 268. A length computation may then be made via a step 272 based upon knowing the longitudinal position of the probe 30 at the time of execution of step 256 and the longitudinal position of the probe 30 at the time of execution of step 264 (e.g., accounting for any known offsets associated with the turntable 20; converting the known longitudinal positions into representative units of length measure).

There are various ways in which length measurements may be implemented using the foregoing and for the case of assembling a fuel tank. As noted above there is one "zero datum" associated with the headstock 16 and another "zero datum" associated with the tailstock 14. Each zero datum is merely a surface which corresponds with the longitudinal position of an end of a fuel tank subassembly which is engaged by the subject headstock 16 or tailstock 14 (e.g., the zero datum and the corresponding end of the subassembly may be "flush" or disposed in parallel relation). One way in which length measurements may be made is to program the computer processor 80 to always first direct the probe 30 toward the relevant headstock 16 or tailstock 14 (which will be known based upon the assembly of the fuel tank 100 which proceeds in a predetermined manner) for engagement of its associated zero datum to establish a first longitudinal position, and to then associate the longitudinal position of the probe 30 on any subsequent engagement with a second longitudinal position such that the length of the relevant structure can be derived therefrom. Another way would be to program the computer processor 80 to only have the probe 30 engage the zero datum associated with the relevant headstock 16 or tailstock 14 once so long as the structure is not removed therefrom. Retention of this longitudinal position may then be used to measure the length of all components having one extreme longitudinally disposed from this same zero datum.

Figure 9:
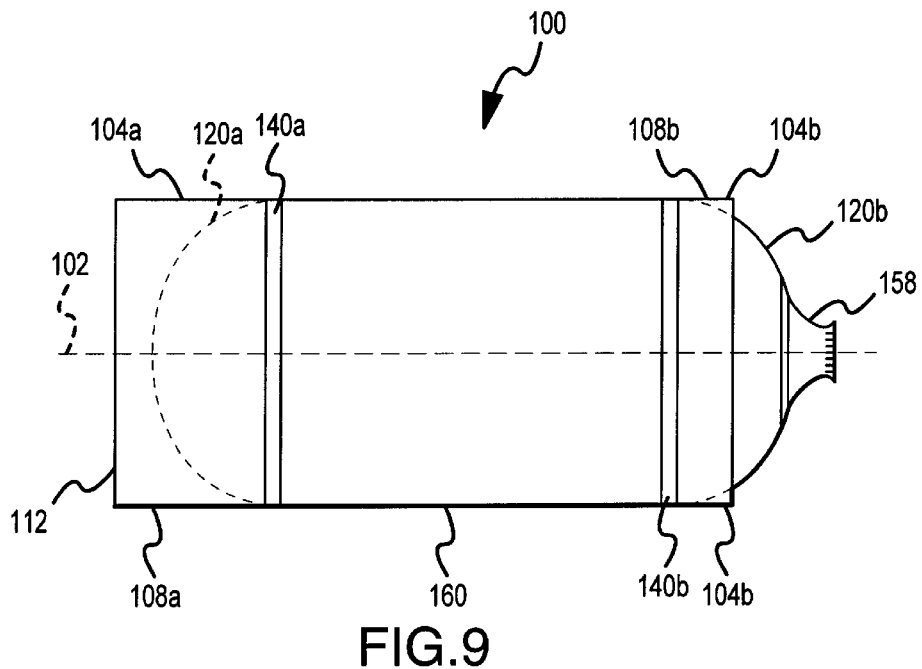
FIG. 9 is an embodiment of a fuel tank which may be assembled by the system of FIG. 1.

The foregoing will also now be summarized in relation the assembly of one embodiment of a fuel tank 100 which is illustrated in FIG. 9 and which defines an enclosed space for the storage of fuel therein. The fuel tank 100 generally includes a first combo 104*a*, a second combo 104*b*, and a barrel 160 extending therebetween. These structures are separate fuel tank subassemblies which are concentrically disposed about and extend along a central, longitudinal axis 102 associated with the fuel tank 100. Two fuel tank subassemblies form each combo 104. One of these subassemblies is a skirt 108. Another of these subassemblies is a dome body 120. Each skirt 108/dome body 120 pair are appropriately interconnected, such as by welding.

Figure 10:
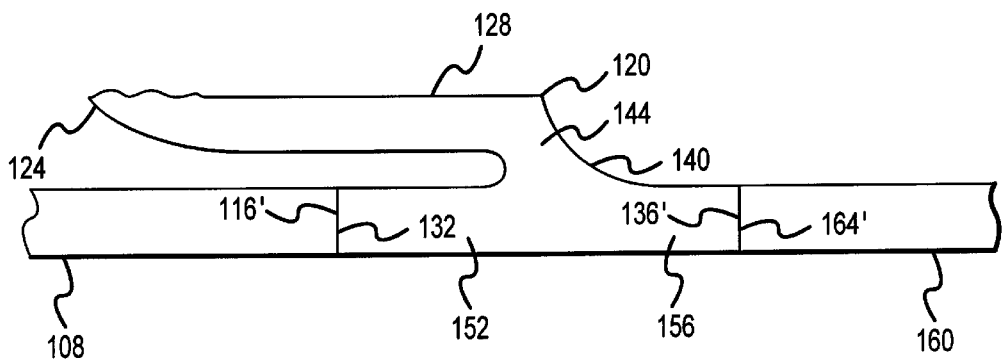
FIG. 10 is an enlarged view of the interconnections between a skirt, dome body, and barrel of the fuel tank of FIG. 9.

Each skirt 108 includes a first skirt end 112 and a second skirt end 116 longitudinally displaced therefrom as illustrated in FIGS. 9–10. A "prime" designation is used herein in relation to certain of the surfaces of the various fuel tank subassemblies which interface with an adjacent fuel tank subassembly and which have been "prepped" in a manner discussed more detail below. In one embodiment each skirt 108 is at least generally of a cylindrical configuration. Both its first skirt end 112 and its second skirt end 116 are "open" when the skirt 108 is received from a supplier, and thereby prior to attachment to its corresponding dome body 120 for a given combo 104. Although the diameter of the two skirts 108 of a given fuel tank 100 may vary, typically the diameter of a given skirt 108 is within a range of about 10 feet to about 14 feet for launch or other space travel vehicle applications. In this regard, the primary function of the skirts 108 is to provide attachment capabilities to another fuel tank or to an engine. Both skirts 108 of a given fuel tank 100 need not necessarily be the same length.

Each dome body 120 includes a convexly-shaped (relative to an exterior surface) domed portion 124 which is "closed" and a cylindrical portion 128 which is interconnected with and extends away from the domed portion 124 to define an open end for the dome body 120. Integral configurations are contemplated for the dome body 120 (i.e., a single piece of material may be used to form both the domed portion 124 and the cylindrical portion 128 such that there is no joint therebetween), as well separately forming the domed portion 124 and cylindrical portion 128 and thereafter appropriately interconnecting the same such as by welding (i.e., to define at least one annular joint therebetween). Although the diameter of the cylindrical portion 128 of each dome body 120 of a given fuel tank 100 may vary, typically the diameter of the cylindrical portion 128 is within a range of about 10 feet to about 14 feet for launch or other space travel vehicle applications.

Figure 15:
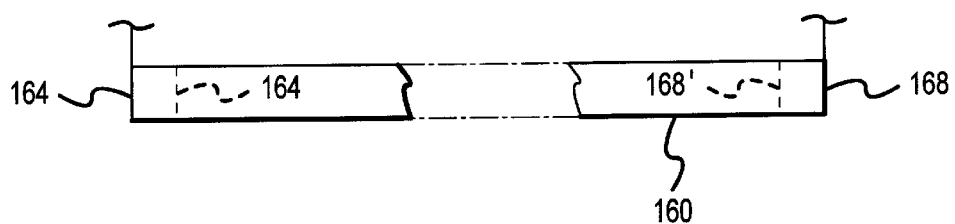
FIG. 15 is an enlarged view of one sidewall of the barrel prior to any end preparations being executed thereon.

The dome body 120 of a given combo 104 is attached to both its corresponding skirt 108 and the barrel 160 of the subject fuel tank 100. What may be characterized as a T-shaped connector 140 is disposed on or at least generally proximate to the end of its corresponding cylindrical portion 128 and which has an annular or circumferential extent. FIG. 10 presents one of these T-shaped connectors 140 in more detail. A lower leg 144 of each T-shaped connector 140 extends radially outwardly from or near an end of its corresponding cylindrical portion 128 (i.e., away from the central, longitudinal axis 102). Disposed at least generally parallel with the central, longitudinal axis 102 of a given T-shaped connector 140 is a first upper leg 152 which extends toward and interconnects with its corresponding skirt 108 and which defines a first dome body end 132, as well as a second upper leg 156 which extends toward and interconnects with the barrel 160 and which defines a second dome body end 136'. The first dome body end 132 of a given dome body 120 interfaces with the second skirt end 116' of its corresponding skirt 108, whereas the second dome body end 136' of a given dome body 120 interfaces with one of the open first or second barrel ends 164', 168' of the barrel 160 (FIG. 15 discussed below).

An enclosed space is defined by the two dome bodies 120 and the barrel 160 for the storage of fuel or the like therein. One or more fuel tanks 100 may be fluidly interconnected to define a bank of fuel tanks 100. In this regard, an adapter 158 may be provided on the domed portion 124 of one or both of the dome bodies 124 to provide access to the enclosed space defined by the pair of dome bodies 120 and interconnecting barrel 160.

Reference should now be made to FIGS. 11–16 for the following discussion of how the system 10 of FIG. 1 may be used assemble the fuel tank 100 just described in relation to FIGS. 9–10. Initially a first skirt end 112*a* of a first skirt 108*a* (FIG. 11) is attached to or mounted on the headstock 16 (FIG. 1) such that the first skirt 108*a* extends away therefrom and towards the tailstock 14. Certain length measurements are made in relation to the first skirt 108*a*. Preparations are also made on the second skirt end 116*a* of this first skirt 108a prior to attaching a first dome body end 132a of a first dome body 120a thereto.

Measurement of the length of the skirt 108a before any "preparation" of the second skirt end 116a is affected by longitudinally advancing the turntable 20 along the track 12 via the drive assembly 88 (e.g., via one servo motor) to have the probe 30 engage the headstock 16 or structure interconnected therewith (e.g., the above-noted "zero datum") which defines a "zero reference point" of sorts and which terminates further longitudinal movement of the turntable 20 in this direction. The signal which is generated by the engagement of the probe 30 on the zero datum associated with the headstock 16 causes a first longitudinal position to be noted/recorded as noted above. Longitudinal movement of the turntable 20 along the track 12 is then reversed by the drive assembly 88 so as to longitudinally dispose the probe 30 close to, but not longitudinally beyond (i.e., in the direction of the tailstock 14) the second skirt end 116a of the subject first skirt 108a. There the probe 30 is advanced toward the first skirt 108a at least generally in the direction of the central, longitudinal axis 102 or "laterally" as noted above (e.g., along an axial path which is at least generally perpendicular to the longitudinal extent of the track 12) by the drive assembly 88 (e.g., by another servo motor) until the probe 30 contacts the outer diameter of the first skirt 108a. Further movement of the probe 30 in the lateral direction is then terminated and its lateral position is at least noted. This determines where the outer diameter of the first skirt 108a is in space at the current radial location of the skirt 108a, and is done because skirts 108 are formed from multiple panels and thus are not necessarily perfectly round. After retracting the probe 30 laterally away from the body of the first skirt 108a a predetermined distance, the turntable 20 is longitudinally advanced along the track 12 and in the direction of the tailstock 14 until the probe 30 is disposed longitudinally beyond the second skirt end 116a of the subject first skirt 108a. Since the general length of each skirt 108 is known, the computer processor 80 can be programmed to automatically direct the turntable 20 to a longitudinal position such that the probe 30 will certainly be disposed beyond the second skirt end 116a (e.g., having the turntable 20 go to a longitudinal position which is equal to this known general length, plus another certain amount). With the probe 30 then in position to establish contact with the second skirt end 116a of the first skirt 108a (i.e., via an initial lateral movement of the probe 30 toward the central, longitudinal axis 102 a distance which was equal to the distance that the probe 30 was retracted away from the first skirt 108a after contacting the same, plus possibly a predetermined, small amount relating to a configuration/dimension of a sensing surface of the probe 30), the turntable 20 is longitudinally advanced back toward the first skirt 108a along the track 12. Longitudinal movement of the turntable 20 along the track 12 is terminated when the probe 30 contacts the second skirt end 116a which generates another signal which causes a second longitudinal position to be noted/recorded in relation to the position of the probe 30. From these two now known longitudinal positions, the length of the first skirt 108a between a point on the first skirt end 112 and a point on the second skirt end 116a (measured along a line parallel with the central, longitudinal axis 102 and at one radial location relative to this axis 102) may be computed. This length may be recorded for the above-noted types of purposes.

Figure 12:
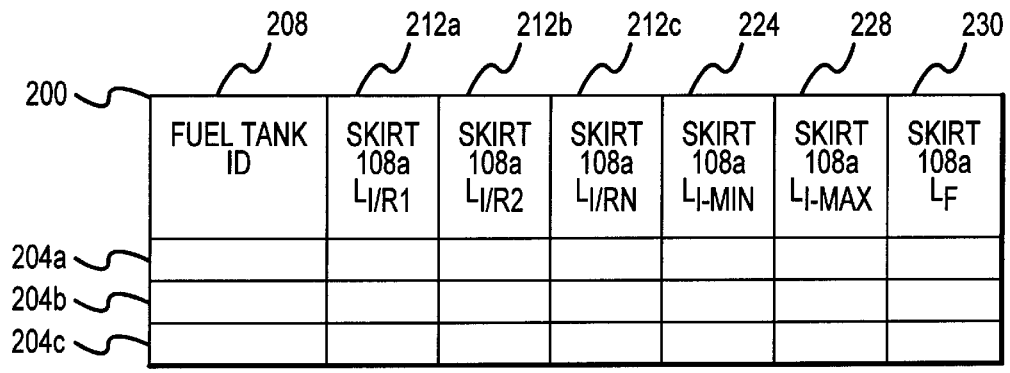
FIG. 12 illustrates part of one embodiment of a database structure having fields for recording skirt length data therein.

FIG. 12 illustrates one embodiment of a data structure 200 which may be implemented on an appropriate computer-readable storage medium system to which the computer processor 80 directs the storage of the above-noted types of information/data. Generally, the database structure 200 accommodates the storage of length data for each fuel tank subassembly of the fuel tank 100, both before and after any machining of any type and also in relation to the subject fuel tank 100. Information on each fuel tank 100 which is assembled may be stored within the database structure 200 as a data entry or record 204. One way to identify a particular fuel tank 100 is to have the database structure 200 include a fuel tank identification field 208 for receipt of information which specifically identifies a particular fuel tank 100 (e.g., a serial number or the like which may be input through an appropriate data entry device associated with the computer 80). Any way of storing the types of data addressed herein in relation to a particular fuel tank 100, and further in relation to a particular subassembly of this fuel tank 100, may be utilized.

Figure 11:
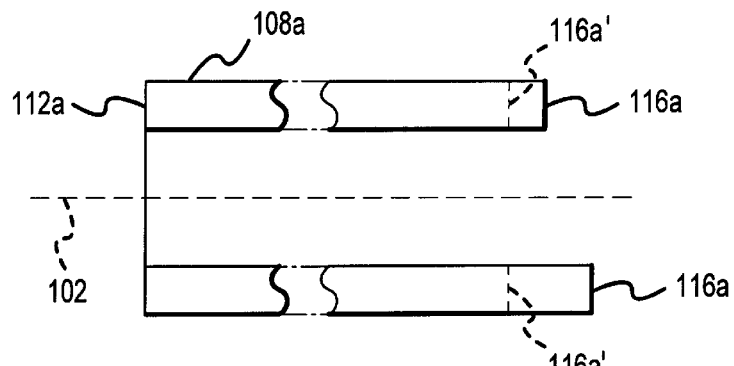
FIG. 11 is a side view of a skirt for the fuel tank of FIG. 9 prior to having its end routered for interconnection with a dome body.

The above-noted length measurement of the first skirt 108a may be recorded in an initial skirt length field 212a as presented in FIG. 12. Additional length measurements are made of the first skirt 108a between different parallel points (relative to the axis 102, and thereby different radial positions) on the first skirt end 112a and the second skirt end 116a since the length of the first skirt 108a may not be uniform about its circumference as indicated by FIG. 11 (exaggerated). This is affected by rotating the first skirt 108a relative to the probe 30, stopping this relative rotation, and then again measuring the length in accordance with the foregoing. For instance, the computer processor 80 may be programmed to measure the first skirt 108a at a certain number of equally spaced radial locations of the first skirt 108a relative to the central, longitudinal axis 102 (e.g., using 15° as the desired spacing, the first length measurement could be characterized as the "0" degree position or $R_1$, the second length measurement would then be 15° therefrom or $R_2$, and so forth). A corresponding number of initial skirt length fields 212 may be included in the database structure 200 for storage of this initial skirt length data.

Having made the plurality of length measurements of the skirt 108a in the above-noted manner, the maximum value within any of the associated initial skirt length fields 212 may be recorded in a maximum skirt length field 228 for the subject data entry 204. Furthermore, the minimum value within any of the associated initial skirt length fields 212 may be recorded in a minimum skirt length field 224 for the subject data entry 204. In the event that the value recorded in this minimum skirt length field 224 is less than the desired end length associated with the first skirt 108a (e.g., from its corresponding engineering drawing), further assembly of the fuel tank 100 will typically be suspended for discussions by appropriate personnel as to how to best recover from this type of situation. The desired end length for the first skirt 108a (with or without a defined tolerance) could be input to the database structure 200 in another field of the structure 200 through an appropriate data input device, and the computer processor 80 could be programmed to alert appropriate personnel if the above-noted type of situation arose/existed. Another way to record length data relating to the plurality of radially spaced locations would be to only record length data in the skirt maximum length field 228 and the skirt minimum length field 224 (i.e., don't record any length which is between the current values in either of these fields 224,228, and instead only update the data in the fields 224, 228).

Information recorded in the minimum and maximum skirt length fields 224,228 may be used for various purposes. Initially, such may be used to evaluate the supplier of the subject first skirt 108a. Specifications are provided to these suppliers as to the desired length for the first skirt 108a, and these specifications may also be recorded in the database structure 200 in relation to each data entry/record 204 within another field of the structure 200. If the length recorded within any minimum skirt length field 224 was less than that specified to the supplier, a notation could also be made in the database structure 200 in relation to the subject data entry/record 204 by incorporating another appropriate field in the database structure 200. This type of information could be evaluated over time to assess the supplier's compliance with the length specifications established by the manufacturer of the fuel tank 100.

Other information may be stored in the database structure 200 in relation to each length measurement discussed herein. For instance, the positional information of the probe 30 when it engaged the body of the first skirt 108a by the noted lateral movement to find the outer diameter of the first skirt 108a at the current radial position of the first skirt 108a, as well as the corresponding radial position of the first skirt 108a, may be stored in the database structure 200 as well. One reason to retain this data would be to retain a profile of the "roundness" of skirts 108 received from a supplier and their compliance with any related tolerances. Another reason would be to use this information to control the lateral position of the saw 40 and/or router 50 for the relevant machining operation.

After appropriate length measurements are made of the first skirt 108a in accordance with the foregoing, its second end 116a is routered to remove material therefrom and thereby defines a new second skirt end 116a'. Knowing the longitudinal position of the extreme edge of the second skirt end 116a of the first skirt 108a (e.g., information which was used to provide data to a corresponding maximum skirt length field 228) may be used by the computer processor 80 to control the longitudinal position of the router 50. Where to laterally position the router 50 so as to contact the second skirt end 116a may be determined through the lateral movements of the probe 30 which found the outer diameter of the first skirt 108a near its second skirt end 116a when measuring the length of the first skirt 108a. Multiple relative movements are used between the first skirt 108a and the router 50 to affect this machining operation. Relative rotational motion is provided between the first skirt 108a and the router 50, such as by rotation of the headstock 16. Moreover, the turntable 20 is longitudinally advanced along the track 12 to direct the router 50 further toward the headstock 16. This longitudinal motion of the turntable 20, and thereby the router 50, is controlled by the computer processor 80. Longitudinal motion of the turntable 20 is terminated when the turntable 20 is at a longitudinal position which should produce the desired length for the first skirt 108a and again may be based upon information stored in the database structure 200.

One final length measurement of the first skirt 108a is made in accordance with the foregoing after the routering of the second skirt end 116a to define a new second skirt end 116a'. This value may be recorded in a final skirt length field 230 of the database structure 200 for the subject data entry/record 204. Information provided in the final skirt length field 230 may be used to evaluate the performance of the router 50. For instance and as noted, the computer processor 80 controls the longitudinal position of the router 50. Information is input to the computer processor 80 as to the desired end length for the first skirt 108a and is used to control the longitudinal position of the router 50 during the noted routering of the first skirt 108a. A comparison of the values in the final skirt length field 230 with the desired end length for the subject first skirt 108a (which again may also be recorded in the database structure 200 in association with the subject data entry/record 204) may be made and also recorded in another appropriate field in relation to the subject data record 204 (e.g., a deviation of sorts). Deviations of more than a certain amount may be used to signal appropriate personnel of a condition which should be immediately addressed. This information may also be monitored over time to identify a trend in the performance of the system 10, and to address a trend before a problem actually arises. This is applicable to all machining operations executed in relation to the assembly of the fuel tank 100 where length measurements are taken.

Figure 13:
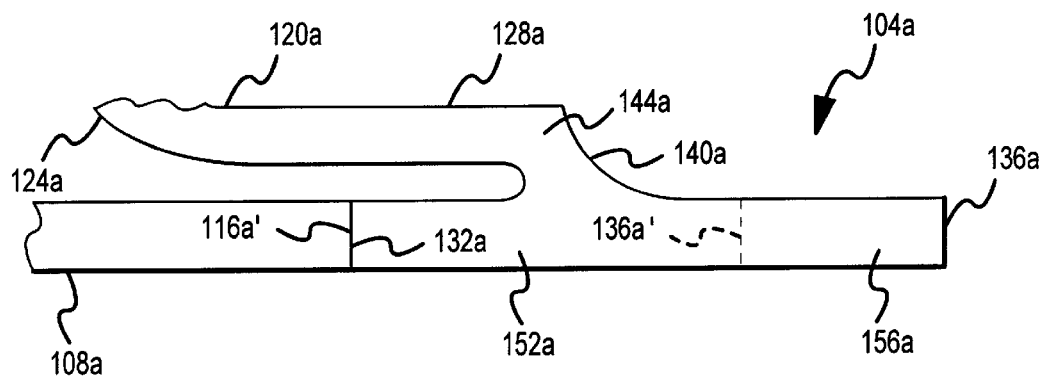
FIG. 13 is an enlarged view of a combo (skirt and dome body) prior to sawing and routering of an end of the dome body for attachment to the barrel.

The first dome body 120a is attached to the first skirt 108a after being prepared in the above-noted manner. In this regard, the first dome body 120a may be mounted on the tailstock 14 via an engagement of its second dome body end 136a. Thereafter the tailstock 14 may be longitudinally advanced along the track 12 toward the headstock 16 to dispose the first dome body end 132a of the first dome body 120a (which has already been appropriately prepped, such as by sanding/filing) in abutting engagement with the second skirt end 116a' of the first skirt 108a as illustrated in FIG. 13. The welding assembly 180 may then be activated to create a circumferential weld between the first skirt 108a and the first dome body 120a to define a first combo 104a. Once welded in this manner, the first dome body 120a may be released by the tailstock 14 such that the tailstock 14 may be longitudinally advanced away from the headstock 16 along the track 12.

Figure 14:
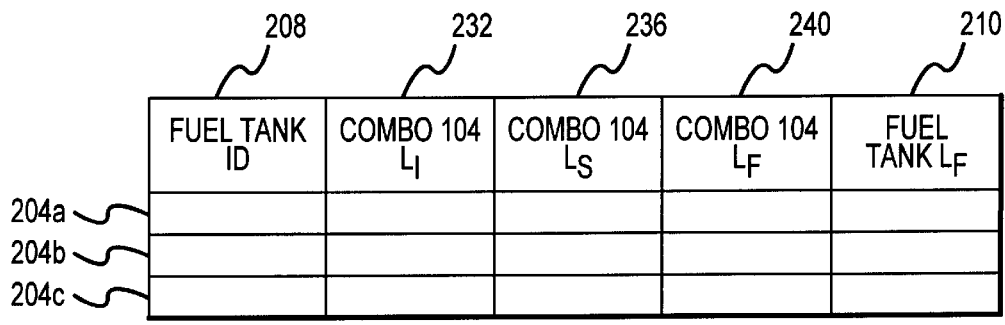
FIG. 14 illustrates further fields of the database structure presented in FIG. 12 for recording combo length data therein.

The length of the first combo 104a thus far formed is measured in the same general manner as discussed above in relation to the first skirt 108a (e.g., having the probe 30 engage the zero datum associated with the headstock 16, and thereafter having the probe 30 engage the second dome body end 136a, all through the noted movements of the turntable 20 longitudinally along the track 12 and also the noted lateral movements of the turntable 20 along the upper portion of the main carriage 24). Knowing the longitudinal position of the probe 30 when it engaged the zero datum associated with the headstock 16 (corresponding with the longitudinal position of the first skirt end 112a), as well as the longitudinal position of the probe 30 when it engaged the second dome body end 136a, allows the length of combo 104a thus far formed to be calculated. This information may be recorded in an initial first combo length field 232 of the database structure 200 for the subject data entry/record 204 and as illustrated in FIG. 14.

Preparation of the second dome body end 136 is undertaken after the length measurement of the combo 104a has been obtained in its current form. Referring again to FIG. 13, first the second upper leg 156a of the dome body 120a is sawed. Where this sawing should occur longitudinally may be determined/controlled through the computer processor 80. This may be implemented in various ways. There are a number of "knowns" at this time. First is the longitudinal position of the second dome body end 136a of the first dome body 120 which was determined for the above-noted length measurement. Another "known" is the desired or predetermined length for the combo 104a in its finished condition (e.g., from the engineering drawing(s) and which may be stored in the database structure 200 in an appropriate field in relation to the subject data entry/record 204 as well). The computer processor 80 may then be programmed to longitudinally move the turntable 20 along the track 12 toward the headstock 16 a predetermined distance from the longitudinal position associated with the second dome body end 136 such that after the cut, the first combo 104a will be slightly longer than the desired length dimension. Another way would be to program the computer processor 80 to engage the headstock 16 and to thereafter move to a longitudinal position using the known longitudinal position of the zero datum of the headstock 16 and the desired length of the first combo 104a. Regardless of which of these two options is employed, subsequent engagement of the circular saw 40 on the first dome body 120a (more specifically on the second upper leg 156a of its T-shaped connector 140a) by a lateral movement of the turntable 20 toward the first dome body 120a, as well as subsequent relative rotational motion between the circular saw 40 and the first dome body 120a, affects a circumferential cut about the first dome body 120a and removes a certain section therefrom. Where to laterally position the saw 40 to establish contact the first dome body 120a may be determined through the lateral movements of the probe 30 which found the outer diameter of the first dome body 120a near its second dome body end 136 when measuring the length of the first dome body 120a.

The length of the first combo 104a thus far formed is measured in the same general manner as discussed above in relation to the first skirt 108a (e.g., having the probe 30 engage the zero datum associated with the headstock 16, and thereafter having the probe 30 engage the second dome body end 136a' which has been sawed, all through the noted longitudinal movements of the turntable 20 along the track 12 and also the noted lateral movements of the turntable 20 along the upper portion of the main carriage 24). Knowing the longitudinal position of the probe 30 when it engaged the zero datum associated with the headstock 16 (corresponding with the longitudinal position of the first skirt end 112a), as well as the longitudinal position of the probe 30 when it engaged the second dome body end 136a' after being sawed, allows the length of combo 104a thus far formed to be calculated. This information may be recorded in a sawed first combo length field 236 of the database structure 200 for the subject data entry/record 204 and as illustrated in FIG. 14. Information stored in the sawed first combo length field(s) 236 of one or more data entries/records 204 may be used to evaluate sawing operations and generally in the manner discussed above in relation to evaluating routering operations (e.g., to determine if the system 10 is malfunctioning by not cutting in the desired longitudinal locale, to identify that the system 10 is trending toward this kind of condition).

Routering of the second dome body end 136a' is undertaken after the noted sawing and length measurement operations have been completed. Knowing the longitudinal position of the extreme edge of the second dome body end 136a' of the first combo 104a after the sawing operation (e.g., which was used to generate length information now stored in the sawed first combo length field 236) may be used by the computer processor 80 to control the longitudinal position of the router 50. Where to laterally position the router 50 so as to contact the second dome body end 136a' may be determined through the lateral movements of the probe 30 which found the outer diameter of the first dome body 120a near its second dome body end 136a' when measuring the length of the first dome body 120a. Multiple relative movements are used between the first combo 104a and the router 50 to affect this machining operation. Relative rotational motion is provided between the first combo 104a and the router 50, such as by rotation of the headstock 16. Moreover, the turntable 20 is longitudinally advanced along the track 12 to direct the router 50 further toward the headstock 16. This longitudinal motion of the turntable 20, and thereby the router 50, is controlled by the computer processor 80. Longitudinal motion of the turntable 20 is terminated when the turntable 20 is at a longitudinal position which should produce the desired end length for the first combo 104a, and again which may be stored in the database structure 200 for access by the computer processor 80.

The length of the first combo 104a after this routering operation is measured in the same general manner as discussed above in relation to the first skirt 108a (e.g., having the probe 30 engage the zero datum associated with the headstock 16, and thereafter having the probe 30 engage the second dome body end 136a' which now has been routered, all through the noted longitudinal movements of the turntable 20 along the track 12 and also the noted lateral movements of the turntable 20 along the upper portion of the main carriage 24). Knowing the longitudinal position of the probe 30 when it engaged the zero datum associated with the headstock 16 (corresponding with the longitudinal position of the first skirt end 112a), as well as the longitudinal position of the probe 30 when it engaged the second dome body end 136a' after being routered, allows the length of first combo 104a thus far formed to be calculated. This information may be recorded in a final first combo length field 240 of the database structure 200 for the subject data entry/record 204 and as illustrated in FIG. 14.

The first combo 104a thus far described is now in condition for attachment to the barrel 160. At this time, however, the first combo 104a is removed from the headstock 16 such that the second combo 104b may be formed in the above-described manner and remain in the headstock 16 for attachment to the barrel 160. The various length measures discussed above in relation to the assembly of the first combo 104a are also taken/made in relation to the assembly of the second combo 104b. Length information relating to the combo 104b is also stored within the database structure 200 in relation to the subject fuel tank 100 and the combo 104b (e.g., using the same types of fields noted above in relation to the assembly of the first combo 104a).

Figure 16:
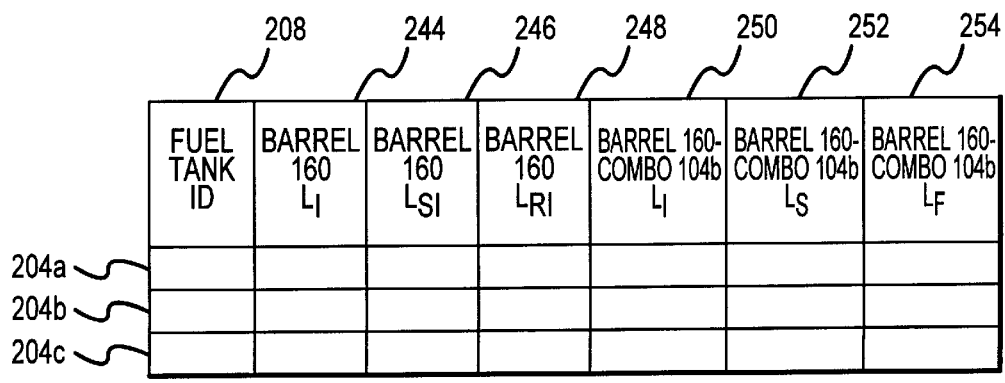
FIG. 16 illustrates further fields of the database structure presented in FIG. 12 for recording barrel and combo/barrel length data therein.

With the second combo 104b remaining on the headstock 16, the barrel 160 is mounted on the tailstock 14 via its first barrel end 164 which is illustrated in FIG. 15. The length of the barrel 160 is measured in the same general manner as discussed above in relation to the first skirt 108a (e.g., having the probe 30 engage the zero datum associated with the tailstock 14, and thereafter having the probe 30 engage the second barrel end 168 through the noted longitudinal movements of the turntable 20 along the track 12 and also the noted lateral movements of the turntable 20 along the upper portion of the main carriage 24). Knowing the longitudinal position of the probe 30 when it engaged the zero datum associated with the tailstock 14 (corresponding with the longitudinal position of the first barrel end 164), as well as the longitudinal position of the probe 30 when it engaged the second barrel end 168 allows the initial length of barrel 160 to be calculated. This information may be recorded in an initial barrel length field 244 of the database structure 200 for the subject data entry/record 204 and as illustrated in FIG. 16.

Preparation of the second barrel end 168 is undertaken after the length measurement of the barrel 160 has been obtained. Referring again to FIG. 15, first the barrel 160 is sawed, typically at least generally proximate its second barrel end 168. Where this sawing should occur longitudinally may be determined/controlled through the computer processor 80. This maybe done various ways. There are a number of "knowns" at this time. First is the longitudinal position of the second barrel end 168 which was determined to generate the above-noted length measurement. Another "known" is the desired or predetermined length for the barrel 160 in its finished condition (e.g., from the engineering drawing(s) and which may be stored in the database structure 200 in yet another field in relation to the subject data entry/record 204 as well). The computer processor 80 may then be programmed to longitudinally move the turntable 20 along the track 12 toward the tailstock 16 a predetermined distance from the longitudinal position associated with the second barrel end 168 such that after the cut, the barrel 160 will be longer than the desired dimension (since the second barrel end 168 is also routered, and further since the first barrel end 164 will be similarly prepped). Another way would be to program the computer processor 80 to engage the tailstock 14 and to thereafter move to a longitudinal position using the known longitudinal position of the zero datum of the tailstock 16 and the desired length of the barrel 160, while allowing for the noted circumstances. Regardless of which of these two options is employed, subsequent engagement of the circular saw 40 on the barrel 160 at least generally proximate its second barrel end 168, as well as subsequent relative rotational motion between the circular saw 40 and the barrel 160, affects a circumferential cut about the barrel 160, removes a portion thereof, and defines a new second barrel end 168'. Where to laterally position the saw 40 so as to contact the barrel 160 at least generally proximate its second barrel end 168 may be determined through the lateral movements of the probe 30 which found the outer diameter of the barrel 168 near its second barrel end 168 when measuring the length of the barrel 160.

The length of the barrel 160 is measured in the same general manner as discussed above in relation to the first skirt 108a after this first sawing operation on the barrel 160 (e.g., having the probe 30 engage the zero datum associated with the tailstock 14, and thereafter having the probe 30 engage the second barrel end 168' which has been newly defined through the noted sawing operation, all through the noted movements of the turntable 20 along the track 12 and also the noted lateral movements of the turntable 20 along the upper portion of the main carriage 24). Knowing the longitudinal position of the probe 30 when it engaged the zero datum associated with the tailstock 14 (corresponding with the longitudinal position of the first barrel end 164), as well as the longitudinal position of the probe 30 when it engaged the second barrel end 168' after the sawing operation allows the length of barrel 160 thus far prepped to be calculated. This information may be recorded in a first sawed barrel length field 246 of the database structure 200 for the subject data entry/record 204 and as illustrated in FIG. 16.

Routering of the second barrel end 168' is undertaken after the noted sawing and length measurement operations have been completed. Knowing the longitudinal position of the extreme edge of the second barrel end 168' after the sawing operation (e.g., using information used to generate the length information stored in the first sawed barrel length field 246) may be used by the computer processor 80 to control the longitudinal position of the router 50. Where to laterally position the router 50 so as to contact the second barrel end 168' may be determined through the lateral movements of the probe 30 which found the outer diameter of the barrel 160 near its second barrel end 168 when measuring the length of the barrel 160. Multiple relative movements are used between the barrel 160 and the router 50 to affect this machining operation. Relative rotational motion is provided between the barrel 160 and the router 50, such as by rotation of the tailstock 14. Moreover, the turntable 20 is longitudinally advanced along the track 12 to direct the router 50 further toward the tailstock 14. This longitudinal motion of the turntable 20, and thereby the router 50, is controlled by the computer processor 80. Longitudinal motion of the turntable 20 is terminated when the turntable 20 is at a longitudinal position which should have allowed for sufficient trimming of the second barrel end 168', and further which should allow for preparation of the first barrel end 164 in the same type of manner to yield a barrel 160 of a predetermined/predefined length. This type of information may also be stored in another field of the database structure 200 in association with the subject barrel 160.

The length of the barrel 160 after this routering operation is measured in the same general manner as discussed above in relation to the first skirt 108a (e.g., having the probe 30 engage the zero datum associated with the tailstock 14, and thereafter having the probe 30 engage the second barrel end 168' which now has been routered, all through the noted longitudinal movements of the turntable 20 along the track 12 and also the noted lateral movements of the turntable 20 along the upper portion of the main carriage 24). Knowing the longitudinal position of the probe 30 when it engaged the zero datum associated with the tailstock 14 (corresponding with the longitudinal position of the first barrel end 164), as well as the longitudinal position of the probe 30 when it engaged the second barrel end 168' after being routered, allows the length of barrel 160 thus far formed to be calculated. This information may be recorded in a first routered barrel length field 248 of the database structure 200 for the subject data entry/record 204 and as illustrated in FIG. 16.

The second barrel end 168' is now ready for attachment to the second dome body end 136b' of the second combo 104b, which is again still mounted in the headstock 16. In this regard, the tailstock 14 is longitudinally advanced along the track 12 to dispose the second barrel end 168' in abutting engagement with the second dome body end 136b' of the second dome body 120b of the second combo 104b. These two components may then be welded together by the welding assembly 180 in the above-described manner. After forming a circumferential weld therebetween, the first barrel end 164 is released by the tailstock 14 and such is longitudinally advanced along the track 12 away from the headstock 16.

Only the first barrel end 164 remains to be prepared for welding to the first combo 104a which may now be installed on the tailstock 14 at an appropriate time. However, first the length of the second combo 104b with the barrel 160 attached thereto is measured in the same general manner as discussed above in relation to the first skirt 108a (e.g., having the probe 30 engage the zero datum associated with the headstock 16, and thereafter having the probe 30 engage the first barrel end 164 through the noted longitudinal movements of the turntable 20 along the track 12 and also the noted lateral movements of the turntable 20 along the upper portion of the main carriage 24). Knowing the longitudinal position of the probe 30 when it engaged the zero datum associated with the headstock 16 (corresponding with the longitudinal position of the first skirt end 112b of the second skirt 108b of the second combo 104b), as well as the longitudinal position of the probe 30 when it engaged the first barrel end 164 allows the combined length of second combo 104b and the barrel 160 interconnected therewith, and thus far formed, to be calculated. This information may be recorded in an initial second combo/barrel length field

250 of the database structure 200 for the subject data entry/record 204 and as illustrated in FIG. 16.

Preparation of the first barrel end 164 is undertaken after the length measurement of the second combo 104*b* and interconnected barrel 160 has been obtained. Referring again to FIG. 15, first the barrel 160 is sawed, typically at least generally proximate its first barrel end 164. Where this sawing should occur longitudinally may be determined/controlled through the computer processor 80. This may be done various ways. There are a number of "knowns" at this time. First is the longitudinal position of the first barrel end 164 which was used to generated the above-noted length measurement. Another "known" is the desired or predetermined final length for the second combo 104*b* with the barrel 160 attached thereto in its finished condition (e.g., from the engineering drawing(s) and which may be stored in the database structure 200 in relation to the subject data entry/record 204 as well). The computer processor 80 may then be programmed to longitudinally move the turntable 20 along the track 12 toward the headstock 16 a predetermined distance from the longitudinal position associated with the first barrel end 164 such that after the cut, the second combo 104*b* with the barrel 160 attached thereto will be slightly longer than the desired dimension. Another way would be to program the computer processor 80 to engage the headstock 16 and to thereafter move to a longitudinal position using the known longitudinal position of the zero datum of the headstock 16 and the desired length of the second combo 104*b* with the barrel 160 attached thereto (allowing for further material removal by routering operations to be described). Regardless of which of these two options is employed, subsequent engagement of the circular saw 40 on the barrel 160, as well as subsequent relative rotational motion between the circular saw 40 and the barrel 160, affects a circumferential cut about the barrel 160 and removes a certain section therefrom. Where to laterally position the saw 40 so as to contact the barrel 160 may be determined through the lateral movements of the probe 30 which found the outer diameter of the barrel 160 near its first barrel end 164 when measuring the length of the barrel 160.

The length of the second combo 104*b* with the barrel 160 attached thereto thus far formed is measured in the same general manner as discussed above in relation to the first skirt 108*a* (e.g., having the probe 30 engage the zero datum associated with the headstock 16, and thereafter having the probe 30 engage the first barrel end 164' which has been sawed, all through the noted longitudinal movements of the turntable 20 along the track 12 and also the noted lateral movements of the turntable 20 along the upper portion of the main carriage 24). Knowing the longitudinal position of the probe 30 when it engaged the zero datum associated with the headstock 16 (corresponding with the longitudinal position of the first skirt end 112*b* of the second skirt 108*b* of the second combo 104*b*), as well as the longitudinal position of the probe 30 when it engaged the first barrel end 164' after being sawed, allows the length of second combo 104 with the barrel 160 attached thereto, and thus far formed, to be calculated. This information may be recorded in a sawed second combo/barrel length field 252 of the database structure 200 for the subject data entry/record 204 and as illustrated in FIG. 16.

Routering of the first barrel end 164' is undertaken after the noted sawing and length measurement operations have been completed. Knowing the longitudinal position of the extreme edge of the first barrel end 164' after the sawing operation (e.g., using information which was used to generate a length stored in the sawed second combo/barrel length field 252) may be used by the computer processor 80 to control the longitudinal position of the router 50. Where to laterally position the router 50 so as to contact the first barrel end 164' may be determined through the lateral movements of the probe 30 which found the outer diameter of the barrel 160 near its first barrel end 164' when measuring the length of the barrel 160. Multiple relative movements are used between the barrel 160 and the router 50 to affect this machining operation. Relative rotational motion is provided between the second combo 104*b* with the barrel 160 attached thereto and the router 50, such as by rotation of the headstock 16. Moreover, the turntable 20 is longitudinally advanced along the track 12 to direct the router 50 further toward the headstock 16. This longitudinal motion of the turntable 20, and thereby the router 50, is controlled by the computer processor 80. Longitudinal motion of the turntable 20 is terminated when the turntable 20 is at a longitudinal position which should produce the desired end length for the second combo 104*b* with the barrel 160 attached thereto, and again which may be stored in the database structure 200 in relation in relation to the subject data entry/record 204.

The length of the second combo 104*b* with the barrel 160 attached thereto after this routering is measured in the same general manner as discussed above in relation to the first skirt 108*a* (e.g., having the probe 30 engage the zero datum associated with the headstock 16, and thereafter having the probe 30 engage the first barrel end 164' which now has been routered, all through the noted longitudinal movements of the turntable 20 along the track 12 and also the noted lateral movements of the turntable 20 along the upper portion of the main carriage 24). Knowing the longitudinal position of the probe 30 when it engaged the zero datum associated with the headstock 16 (corresponding with the longitudinal position of the first skirt end 112*b* of the second skirt 108*b* of the second combo 104*b*), as well as the longitudinal position of the probe 30 when it engaged the first barrel end 164' after being routered, allows the length of second combo 104*b* with the barrel 160 attached thereto to be calculated. This information may be recorded in a final second combo/barrel length field 254 of the database structure 200 for the subject data entry/record 204 and as illustrated in FIG. 16.

The first barrel end 164' is now ready for attachment to the second dome body end 136*a'* of the first combo 104*a*, which is again now mounted in the tailstock 14. In this regard, the tailstock 14 is longitudinally advanced along the track 12 to dispose the first barrel end 164' in abutting engagement with the second dome body end 136*a'* of the first dome body 120*a* of the first combo 104*a*. These two components may then be welded together by the welding assembly 180 generally in the above-described manner. After forming a circumferential weld, the assembled fuel tank 100 is measured. In this regard, the assembled fuel tank 100 is first released from the tailstock 14. Then the probe 30 is longitudinally advanced along the track 12 so as to engage the datum associated with the headstock 16, and thereafter to engage the opposite end of the fuel tank 100 generally in the above-described manner (including the above-noted lateral movement to "find" location of the outer diameter). This length measurement may be recorded in an appropriate field of the database structure 200 in association with the subject fuel tank 100. Thereafter the fuel tank 100 may also be released from the headstock 16 for removal of the tank 100 from the system 10.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for assembling an enclosed fuel tank associated with a space travel vehicle, wherein said fuel tank comprises a first skirt and a first dome body, and wherein said method comprises the steps of:

executing a first measuring step comprising measuring a distance from a first end of said first skirt to a second end of said first skirt, wherein said distance measured by said executing a first measuring step is a first length measurement, and wherein said executing a first measuring step comprises moving a measuring device relative to said first skirt along a path which is at least generally parallel with said first skirt;

recording said first length measurement, wherein said recording said first length measurement step comprises sending a signal from said measuring device to a computer-readable storage medium which is indicative of said first length measurement;

executing a first machining operation on said first skirt to define a new said second end for said first skirt, said executing a first machining operation step being executed after said executing a first measuring step;

executing a second measuring step comprising measuring a distance from said first end to said new said second end of said first skirt, said executing a second measuring step being executed after said executing a first machining operation step, wherein said distance measured by said executing a second measuring step is a second length measurement, and wherein said executing a second measuring step comprises moving said measuring device relative to said first skirt along a path which is at least generally parallel with said first skirt;

recording said second length measurement, wherein said recording said second length measurement step comprises sending a signal from said measuring device to said computer-readable storage medium which is indicative of said second length measurement; and attaching said dome body to said new said second end of said first skirt, wherein said executing a first measuring step, said executing a first machining operation step, said executing a second measuring step, and said attaching step are all executed while said first skirt is mounted in a space travel vehicle fuel tank assembly apparatus.

2. The method, as claimed in claim 1, wherein:

said executing a first measuring step comprises:

executing a first longitudinally advancing step comprising longitudinally advancing said measuring device in a first direction first towards said second end of said first skirt and then continuing past said second end of said first skirt such that said second end of said first skirt is then disposed longitudinally between said first end of said first skirt and said measuring device;

executing a second longitudinally advancing step after said executing a first longitudinally advancing step, comprising longitudinally advancing said measuring device in a second direction back towards said second end of said first skirt, said second direction being directly opposite of said first direction; and terminating said executing a second axially advancing step upon engagement of said measuring device with a portion of said second end of said first skirt.

3. The method, as claimed in claim 2, wherein:

said executing a first measuring step comprises disposing said measuring device at a first position which corresponds with said first end of said first skirt before said executing a first longitudinally advancing step, noting a second position of said measuring device after said terminating step, and basing a corresponding said first length measurement on said first and second positions.

4. The method, as claimed in claim 3, wherein:

said disposing step comprises executing a third longitudinally advancing step before either of said executing a first longitudinally advancing step and said executing a second longitudinally advancing step, said executing a third longitudinally advancing step comprising longitudinally advancing said measuring device in said second direction towards said first end of said first skirt.

5. The method, as claimed in claim 2, wherein said first skirt is disposed about and extends along a reference axis and wherein said executing a first measuring step further comprises:

executing a third longitudinally advancing step before either of said executing a first longitudinally advancing step and said executing a second longitudinally advancing step, said executing a third longitudinally advancing step comprising longitudinally advancing said measuring device in said first direction towards said second end of said first skirt;

terminating said executing a third longitudinally advancing step before said measuring device is disposed past said second end of said first skirt;

executing a first laterally step comprising laterally advancing said measuring device towards said first skirt and said reference axis;

terminating said executing a first laterally advancing step when said measuring device engages said first skirt;

noting a position of said measuring device at said terminating said executing a first laterally advancing step;

executing a second laterally advancing step comprising laterally advancing said measuring device away from said first skirt after said noting step;

executing said executing a first longitudinally advancing step after said executing a second laterally advancing step;

executing a third laterally advancing step comprising laterally advancing said measuring device toward reference axis and to a lateral position based upon said noting step; and executing said executing a second longitudinally advancing step after said executing a third laterally advancing step, wherein said noting step at least increases a likelihood of said measuring device engaging said second end of said first skirt during said executing a second longitudinally advancing step.

6. The method, as claimed in claim 1, further comprising the step of:

repeating said executing a first measuring step at each of a plurality of radially spaced locations on said first skirt.

7. The method, as claimed in claim 6, further comprising the step of:

identifying both a minimum and a maximum value of a plurality of said first length measurements generated by said repeating step.

8. The method, as claimed in claim 6, further comprising the steps of:
having a predetermined length requirement for said first skirt; and
determining if a smallest magnitude of a plurality of said first length measurements generated by said repeating step is within a predetermined tolerance associated with said predetermined length requirement.

9. The method, as claimed in claim 6, wherein:
said executing a first machining operation step is routering said second end of said first skirt.

10. The method, as claimed in claim 6, further comprising the steps of:
using relative rotational motion between said first skirt and said measuring device used by said executing a first measuring step to position said measuring device at each of said plurality of radially spaced locations on said first skirt;
stopping said relative rotational motion at each of said plurality of radially spaced locations for a corresponding execution of said executing a first measuring step.

11. The method, as claimed in claim 1, wherein:
said executing a first machining operation step comprises first longitudinally advancing at least one machining tool along said first skirt to a certain longitudinal location and then laterally advancing said at least one machining tool into engagement with said first skirt.

12. The method, as claimed in claim 11, wherein:
said measuring device used by said executing a first measuring step and said executing a second measuring step is mounted on a first structure, wherein said at least one machining tool is also mounted on said first structure, and wherein said executing a first measuring step and said executing a second measuring step comprise longitudinally moving said first structure with said at least one machining tool being maintained in spaced relation with said first skirt.

13. The method, as claimed in claim 1, further comprising the steps of:
repeating said executing a first measuring step, said recording said first length measurement step, said executing a first machining operation step, said executing a second length measurement step, said recording said second length measurement step, and said attaching step for a plurality of said first skirts and said first dome bodies; and
evaluating compliance with manufacturing specifications by a supplier of said first skirts using each execution of a said recording said first length measurement step.

14. The method, as claimed in claim 1, wherein:
said executing a first machining operation step is selected from the group consisting of sawing and routering.

15. The method, as claimed in claim 1, further comprising the steps of
repeating said executing a first measuring step, said recording said first length measurement step, said executing a first machining operation step, said executing a second measuring step, said recording said second length measurement step, and said attaching step for a plurality of said first skirts and said first dome bodies; and
evaluating a performance of said executing a first machining operation step using each execution of said recording said second length measurement step.

16. The method, as claimed in claim 1, wherein:
said second end of said first skirt is defined by an initial manufacture of said first skirt.

17. A method for assembling an enclosed fuel tank associated with a space travel vehicle, wherein said fuel tank comprises first and second fuel tank subassemblies, wherein each of said first and second fuel tank subassemblies comprise first and second ends, wherein said first fuel tank subassembly is a skirt and said second fuel tank subassembly is a dome body, said method comprising the steps of:
executing a first measuring step comprising measuring a distance from said first end to said second end of said first fuel tank subassembly at a first radial location relative to a central, longitudinal reference axis about which said first filet tank subassembly is disposed, wherein said executing a first measuring step comprises moving a measuring device along a path which is at least generally parallel with said reference axis;
executing a first rotating step comprising rotating said first fuel tank subassembly relative to said measuring device about said reference axis so as to dispose said measuring device at a second radial location relative to said reference axis, wherein said second radial location is different from said first radial location;
executing a second measuring step comprising measuring a distance from said first end to said second end of said first fuel tank subassembly at said second radial location relative to said reference axis, wherein said executing a second measuring step comprises moving said measuring device along a path which is at least generally parallel with said reference axis;
executing a second rotating step comprising rotating said first fuel tank subassembly relative to said measuring device about said reference axis so as to dispose said measuring device at a third radial location relative to said reference axis, wherein said third radial location is different from each of said first and second said first radial locations;
executing a third measuring step comprising measuring a distance from said first end to said second end of said first fuel tank subassembly at said third radial location relative to said reference axis, wherein said executing a third measuring step comprises moving said measuring device along a path which is at least generally parallel with said reference axis;
determining if any of said distances from any of said measuring steps is less than a specified length for said first fuel tank subassembly in said fuel tank;
executing a first machining operation on said first fuel tank subassembly to define a new said second end for said first fuel tank subassembly, wherein said executing a first machining operation step is executed only at execution of said determining step; and
attaching said first end of said second fuel tank subassembly to said new said second end of said first fuel tank subassembly, wherein said executing a first measuring step, said executing a first rotating step, said executing a second measuring step, said executing a second rotating step, said executing a third measuring step, said determining step, said executing a first machining operation step, and said attaching step are all executed while said first fuel tank subassembly is mounted in a space travel vehicle fuel tank assembly apparatus.

18. The method, as claimed in claim 17, wherein:
said executing a first measuring step comprises:

executing a first longitudinally advancing step comprising longitudinally advancing said measuring device in a first direction first towards said second end of said first fuel tank subassembly and then continuing past said second end of said first fuel tank subassembly such that said second end of said first fuel tank subassembly is then disposed longitudinally between said first end of said first filet tank subassembly and said measuring device;

executing a second longitudinally advancing step after said executing a first longitudinally advancing step comprising longitudinally advancing said measuring device in a second direction back towards said second end of said first fuel tank subassembly, said second direction being directly opposite of aid first direction; and terminating said executing a second longitudinally advancing step upon engagement of said measuring device with a portion of said second end of said first fuel tank subassembly.

19. The method, as claimed in claim 18, wherein:

said executing a first measuring step comprises noting a first position of said measuring device before said executing a first longitudinally advancing step, noting a second position of said m device after said terminating step, and basing said first length measurement on said first and second positions.

20. The method, as claimed in claim 17, further comprising the step of:

identifying both a minimum and a maximum value of said distances from said executing a first, second, and third measuring steps.

21. The method, as claimed in claim 17, wherein:

said executing a first machining operation step is routering said second end of said first fuel tank subassembly.

* * * * *

UNITED STATES PATENT AND TRADEMARK OFFICE
CERTIFICATE OF CORRECTION

PATENT NO.  : 6,212,752 B1
DATED       : April 10, 2001
INVENTOR(S) : Hansen et al.

It is certified that error appears in the above-identified patent and that said Letters Patent is hereby corrected as shown below:

Column 28,
Line 15, delete the word "filet" and insert therefor -- fuel --.
Line 53, delete the word "at" and insert therefor -- after --.

Column 29,
Line 8, delete the word "filet" and insert therefor -- fuel --.

Column 30,
Line 6, delete the word "m" and insert therefor -- measuring --.

Signed and Sealed this

Sixth Day of November, 2001

Attest:

NICHOLAS P. GODICI
*Attesting Officer*    *Acting Director of the United States Patent and Trademark Office*